US011363349B2

(12) United States Patent
DeFaria et al.

(10) Patent No.: US 11,363,349 B2
(45) Date of Patent: *Jun. 14, 2022

(54) GEOMETRY MATCHING IN VIRTUAL REALITY AND AUGMENTED REALITY

(71) Applicants: WARNER BROS. ENTERTAINMENT INC., Burbank, CA (US); Christopher DeFaria, Burbank, CA (US)

(72) Inventors: Christopher DeFaria, Santa Monica, CA (US); Michael Smith, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,509

(22) Filed: Oct. 29, 2020

(65) Prior Publication Data

US 2021/0120317 A1    Apr. 22, 2021

Related U.S. Application Data

(63) Continuation of application No. 16/179,710, filed on Nov. 2, 2018, now Pat. No. 10,827,233, which is a
(Continued)

(51) Int. Cl.
*H04N 13/00* (2018.01)
*H04N 21/81* (2011.01)
(Continued)

(52) U.S. Cl.
CPC ......... *H04N 21/816* (2013.01); *G06T 15/205* (2013.01); *H04N 13/117* (2018.05); *H04N 13/30* (2018.05); *H04N 21/8146* (2013.01)

(58) Field of Classification Search
CPC .... H04N 21/816; H04N 13/30; H04N 13/117; H04N 21/8146; H04N 13/279;
(Continued)

(56) References Cited

U.S. PATENT DOCUMENTS 8,803,873 B2 *  8/2014  Yoo ...................... H04N 13/261
                                                       345/419
9,129,430 B2 *  9/2015  Salter .................... G06F 3/167
(Continued)

FOREIGN PATENT DOCUMENTS

EP          17793084.9         6/2019
EP          17793084.9        11/2021
WO              WO             8/2017
       PCT/US2017/030467

OTHER PUBLICATIONS

Benko Hrvoje et al. "FoveAR", Proceedings of the 28$^{th}$ annual ACM Symposium on User Interface Software & Technology, UIST '15, ACM Press, New York, New York, USA, Nov. 5, 2015 (Nov. 5, 2015), pp. 129-135, XP058076925, DOI: 10.1145/2807442. 2807493 ISBN:978-1-4503-3779-3 *the whole document*.

Primary Examiner — Gims S Philippe
(74) Attorney, Agent, or Firm — One LLP

(57) ABSTRACT

Methods, apparatus and systems for geometric matching of virtual reality (VR) or augmented reality (AR) output contemporaneously with video output formatted for display on a 2D screen include a determination of value sets that when used in image processing cause an off-screen angular field of view of the at least one of the AR output object or the VR output object to have a fixed relationship to at least one of the angular field of view of the onscreen object or of the 2D screen. The AR/VR output object is outputted to an AR/VR display device and the user experience is improved by the
(Continued)

geometric matching between objects observed on the AR/VR display device and corresponding objects appearing on the 2D screen.

20 Claims, 13 Drawing Sheets

Related U.S. Application Data continuation of application No. PCT/US2017/030467, filed on May 1, 2017.

(60) Provisional application No. 62/330,708, filed on May 2, 2016.

(51) Int. Cl.
*H04N 13/117* (2018.01)
*G06T 15/20* (2011.01)
*H04N 13/30* (2018.01)

(58) Field of Classification Search
CPC ... H04N 13/344; G06T 15/205; G06T 19/006; G06T 15/20
USPC .......................................................... 348/43
See application file for complete search history.

(56) References Cited

U.S. PATENT DOCUMENTS

| | | | |
|---|---|---|---|
| 9,304,194 B2* | 4/2016 | Rhee | G06T 7/246 |
| 2011/0018903 A1 | 1/2011 | Lapstun et al. | |
| 2011/0109619 A1* | 5/2011 | Yoo | G06F 3/013 |
| | | | 345/419 |
| 2011/0279446 A1* | 11/2011 | Castro | G06T 15/20 |
| | | | 345/419 |
| 2012/0127284 A1 | 5/2012 | Bar-Zeev et al. | |
| 2012/0176474 A1 | 7/2012 | Border | |
| 2012/0236119 A1* | 9/2012 | Rhee | G01S 3/7864 |
| | | | 348/46 |
| 2015/0312561 A1 | 10/2015 | Hoof | |
| 2016/0026253 A1 | 1/2016 | Bradski et al. | |
| 2016/0098095 A1* | 4/2016 | Gonzalez-Banos | A63F 13/92 |
| | | | 345/156 |

* cited by examiner

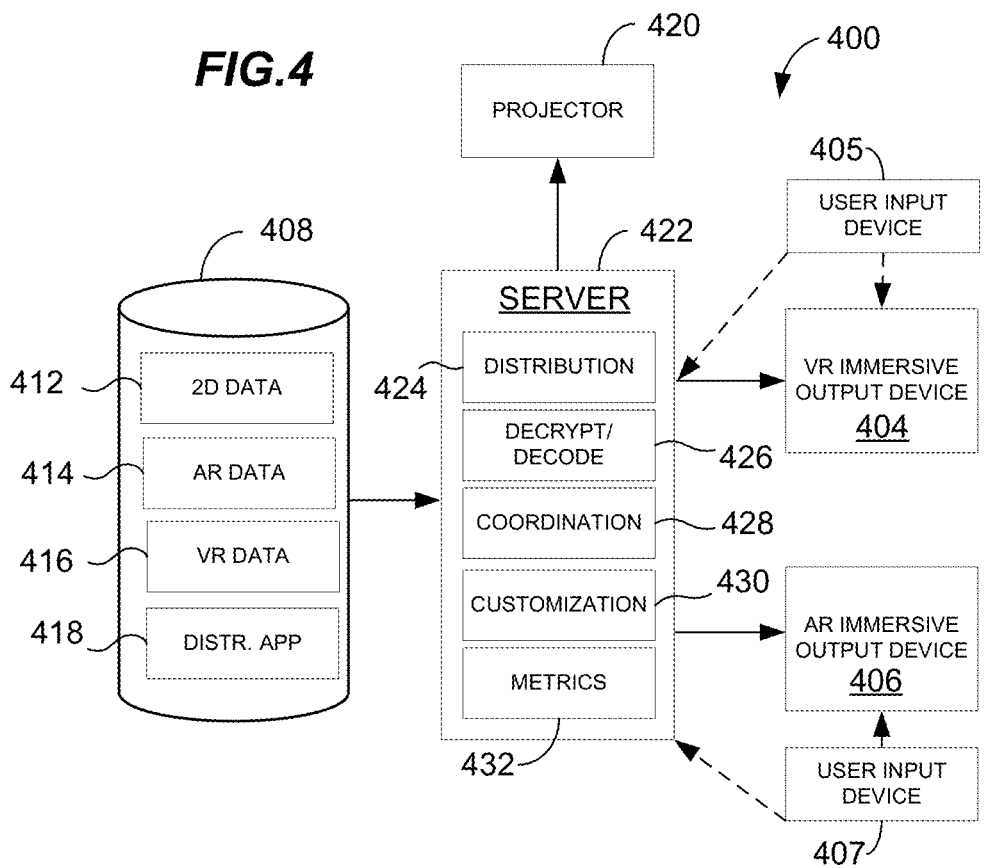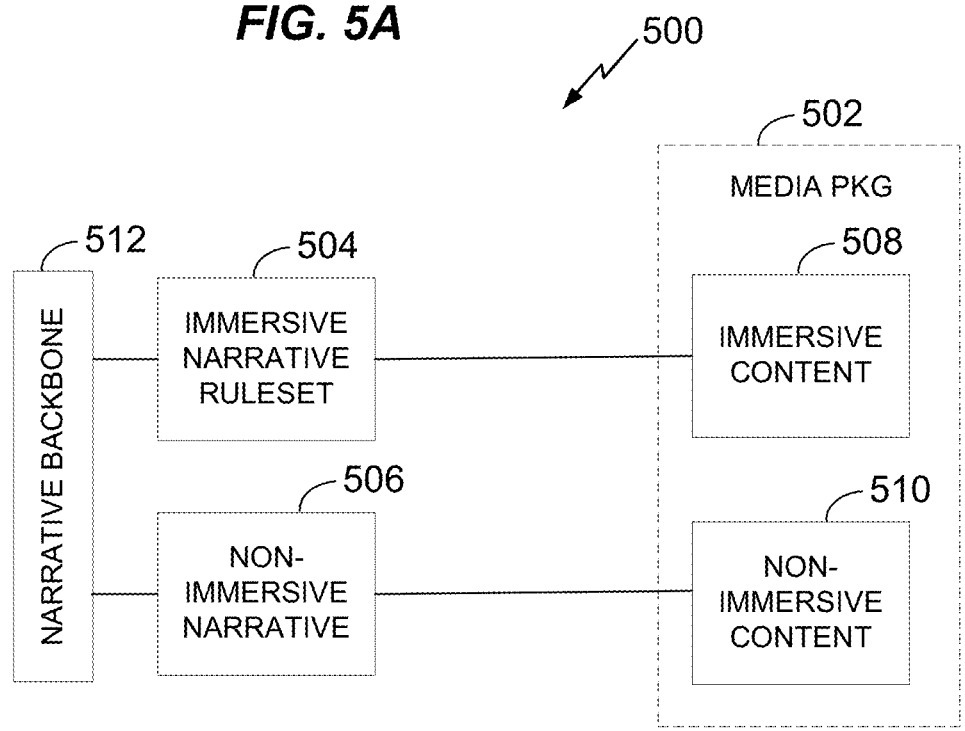

1210
RECEIVING BY AT LEAST ONE OF AN AR OUTPUT DEVICE OR A VR OUTPUT DEVICE, DIGITAL CINEMATIC MASTER DATA THAT INCLUDES AT LEAST ONE OF AUGMENTED REALITY (AR) DATA OR VIRTUAL REALITY (VR) DATA FOR DISPLAYING ONE OF AN AR OUTPUT OBJECT OR A VR OUTPUT OBJECT CONTEMPORANEOUSLY WITH VIDEO DATA FORMATTED FOR DISPLAY ON A 2D SCREEN

1220
DETERMINING A FIRST VALUE SET INDICATING AT LEAST ONE OF AN ANGULAR FIELD OF VIEW OF THE 2D SCREEN OR OF AN OBJECT APPEARING THEREON

1230
DETERMINING A SECOND VALUE SET INDICATING A SHORTEST CURRENT DISTANCE BETWEEN THE 2D SCREEN AND THE AT LEAST ONE OF THE AR OUTPUT DEVICE OR THE VR OUTPUT DEVICE

1240
CALCULATING A THIRD VALUE SET FOR CAUSING AN OFF-SCREEN ANGULAR FIELD OF VIEW OF THE AT LEAST ONE OF THE AR OUTPUT OBJECT OR THE VR OUTPUT OBJECT TO HAVE A FIXED RELATIONSHIP TO AT LEAST ONE OF THE ANGULAR FIELD OF VIEW OF THE ONSCREEN OBJECT OR OF THE 2D SCREEN

1250
OUTPUTTING THE AT LEAST ONE OF THE AR OUTPUT OBJECT OR THE VR OUTPUT OBJECT HAVING THE OFF-SCREEN ANGULAR FIELD OF VIEW

1310
DETERMINING AT LEAST ONE OF AN ORIENTATION AND POSITION OF THE AT LEAST ONE OF THE AR OUTPUT DEVICE OR THE VR OUTPUT DEVICE, RELATIVE TO THE 2D SCREEN

1320
DETERMINING AT LEAST ONE OF AN ORIENTATION AND POSITION OF THE AT LEAST ONE OF THE AR OUTPUT OBJECT OR THE VR OUTPUT OBJECT, RELATIVE TO THE 2D SCREEN

1330
CALCULATING THE OFF-SCREEN ANGULAR FIELD OF VIEW FURTHER BASED ON AT LEAST ONE OF THE ORIENTATION AND POSITION

1340
CALCULATING THE OFF-SCREEN ANGULAR FIELD OF VIEW FURTHER BASED ON MEETING A DEFINED PERCEPTUAL CRITERIA FOR A PORTION OF THE DIGITAL CINEMATIC MASTER DATA

1350
VARYING THE PERCEPTUAL CRITERIA BASED ON TRANSITIONING BETWEEN DIFFERENT PORTIONS OF THE DIGITAL CINEMATIC MASTER DATA

GEOMETRY MATCHING IN VIRTUAL REALITY AND AUGMENTED REALITY

CROSS-REFERENCE TO RELATED APPLICATION

The present application is a continuation of U.S. patent application Ser. No. 16/179,710, filed Nov. 2, 2018 (now U.S. Pat. No. 10,827,233), which is a continuation of International Patent Application No. PCT/US17/30467 filed May 1, 2017, which claims priority to U.S. Provisional Patent Application Ser. No. 62/330,708 filed May 2, 2016, the disclosures of all of which are incorporated herein by reference in their entireties.

FIELD

The present disclosure relates to methods and apparatus for configuration, by a computer, of digital data for virtual reality or augmented reality output that is geometrically and chronologically coordinated with contemporaneous cinematic output for display on a two-dimensional screen.

BACKGROUND

"Virtual reality" is a term that has been used for various types of content that simulates immersion in a three-dimensional (3D) world, including, for example, various video game content, and animated film content. In some types of virtual reality, a user can navigate through a simulation of a 3D environment generated based on the computer model, by controlling the position and orientation of a virtual camera that defines a viewpoint for a 2D scene that is displayed on a two-dimensional display screen. A variation of these technologies is sometimes called "augmented reality." In an augmented reality setup, the display technology shows a combination of the user's surroundings that is "augmented" by one or more digital objects or overlays. Augmented reality content may be used for applications such as providing textual "heads up" information about objects or people visible around the user, inserting virtual objects into a real environment, enabling user or environmental interaction with inserted objects, or transforming the entire appearance of the user's surroundings into a fantasy environment compatible with the user's real surroundings.

Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene. In the case of augmented reality (AR) content, the viewer may experience the augmented content as if it were a part of, or placed in, an augmented real scene.

These immersive effects may be provided or enhanced by motion sensors in the headset that detect motion of the user's head, and adjust the video display(s) accordingly. By turning his head to the side, the user can see the virtual reality scene off to the side; by turning his head up or down, the user can look up or down in the virtual reality scene. The headset may also include tracking sensors that detect position of the user's head and/or body, and adjust the video display(s) accordingly. By leaning or turning, the user can see the virtual reality scene from a different point of view. This responsiveness to head movement, head position and body position greatly enhances the immersive effect achievable by the headset. The user may be provided the impression of being placed inside or "immersed" in the virtual reality scene. As used herein, "immersive" generally encompasses both VR and AR.

Immersive headsets and other wearable immersive output devices are especially useful for game play of various types, which involve user exploration of a modelled environment generated by a rendering engine as the user controls one or more virtual camera(s) using head movement, the position or orientation of the user's body, head, eye, hands, fingers, feet, or other body parts, and/or other inputs. To provide an immersive experience, the user needs to perceive a freedom of movement that is in some way analogous to human visual perception when interacting with reality. Content produced for VR can provide this experience using techniques for real-time rendering that have been developed for various types of video games. The content is may be designed as a three-dimensional computer model with defined boundaries and rules for rendering as video output. This content can be enhanced by stereoscopic techniques to provide stereoscopic output, sometime referred to as "3D," and associated with a VR application that manages the rendering process in response to movement of the VR headset, to produce a resulting VR experience. The user experience is very much like being placed inside a rendered video game.

In other types of VR and AR, the simulated 3D environment may be used primarily to tell a story, more like traditional theater or cinema. In this type of VR or AR, the added visual effects may enhance the depth and richness of the story's narrative elements or special effects, without giving the user full control (or any control) over the narrative itself. However, the technology for experiencing anything similar to cinematic content delivered using VR or AR equipment or methods is in a very early stage of development. Actual implementations of AR and VR technology for experience of narrative content are not yet commercially significant.

It would be desirable, therefore, to develop new methods and other new technologies for mastering cinematic content for VR and AR use, that overcome these and other limitations of the prior art and enhance the appeal and enjoyment of narrative content for new immersive technologies such as VR and AR.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method includes receiving digital cinematic master data that includes at least one of AR or VR data for displaying one of an AR output object or a VR output object contemporaneously with video data formatted for display on a 2D screen. The video data may be 2D video data, or 3D (stereoscopic) video data for display on the 2D screen. A VR output device may output both the VR data and the video data on a virtual screen in a VR display, or an AR output device may output the AR data in an AR display in contemporaneous coordination with a separate display device that displays the video data on a screen.

In an aspect, the method may include determining a first value set indicating at least one of an angular field of view of the 2D screen or of an object appearing thereon relative to the at least one of the AR output device or the VR output device, and determining a second value set indicating a shortest current distance between the 2D screen and the at least one of the AR output device or the VR output device. The method may include calculating a third value set for causing an off-screen angular field of view of the at least one of the AR output object or the VR output object to have a fixed relationship to at least one of the angular field of view of the onscreen object or of the 2D screen. The calculating may be based at least in part on the first value set and on the second value set. The method may include outputting data for displaying the at least one of the AR output object or the VR output object having the off-screen angular field of view.

In other aspects, the method may include determining at least one of an orientation and position of the at least one of the AR output device or the VR output device, relative to the 2D screen. Calculating the off-screen angular field of view may be further based on at least one of the orientation and position. In addition, the method may include determining at least one of an orientation and position of the at least one of the AR output object or the VR output object, relative to the 2D screen. In such case, calculating the off-screen angular field of view may be further based on at least one of the orientation and position. In addition, calculating the off-screen angular field of view may further be based on meeting a defined perceptual criterion for a portion of the digital cinematic master data, for example, for a single scene or set of related scenes. In an aspect, the perceptual criterion may include specifying a perceived size of the at least one of the AR output object or the VR output object relative to a related on-screen object of matching type according to a relation selected from: substantially greater than, substantially less than, or substantially equal to. In an other aspect, the method may include varying the perceptual criterion based on transitioning between different portions of the digital cinematic master data.

In other aspects, the digital cinematic master data includes at least the VR data, and the VR output device renders the video data formatted for display on the 2D screen being a virtual 2D screen. In related aspects, determining the first value set may include reading, from a computer memory, a preset value for the angular field of view of the 2D screen or of the object appearing thereon. In related aspects, determining the second value set may include reading, from a computer memory, a preset value for the shortest current distance between the 2D screen and the VR output device. The method may include, for example, configuring the virtual 2D screen and a surrounding virtual environment for output from the VR output device so that a perceived distance to the 2D screen substantially matches the preset value.

In other aspects, the digital cinematic master data includes at least the AR data, and a device (e.g., a projector, television, laptop computer, notepad computer, or smartphone) distinct from the AR output device renders the video data formatted for display on the 2D screen, being a real 2D screen. In such cases, determining the first value set may include measuring the angular field of view of the 2D screen or of the object appearing thereon at least in part using a sensor coupled to the AR output device. In addition, determining the second value set may include measuring a shortest current distance between the 2D screen and the AR output device at least in part using a sensor coupled to the AR output device.

Any of the foregoing methods may be implemented in any suitable programmable computing apparatus, by provided program instructions encoded in a non-transitory computer-readable medium that, when executed by a computer processor, cause the apparatus to perform the described operations. An apparatus may include a computer or set of connected computers that is used in video production or is installed in a cinema or home theater. Other elements of the apparatus may include, for example, a display screen, an audio output device, and a user input device, which participate in the execution of the method. An apparatus may include a virtual reality device, such as a headset or other display that reacts to movements of a user's head or body to provide the impression of being placed inside of the rendered scene in which the game is played.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4 is a concept diagram illustrating elements of a system for outputting immersive content to multiple users in a cinema or home theater setting.

FIG. 5A is a block diagram illustrating aspects of a media package holding audio-video data with a predetermined narrative with additional content coordinated with the predefined narrative and configured for providing an alternative output.

FIGS. 9A-C are diagrams illustrating geometrical elements of a play space (e.g., theater or home cinema) suitable for serving VR or AR data to a user of the play space contemporaneously with two-dimensional (2D) data for display on a screen or the like.

FIG. 12 is a flow chart illustrating a method for geometry matching in AR or VR.

FIGS. 13-15 are flow charts illustrating further optional aspects or operations of the method diagrammed in FIG. 12.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
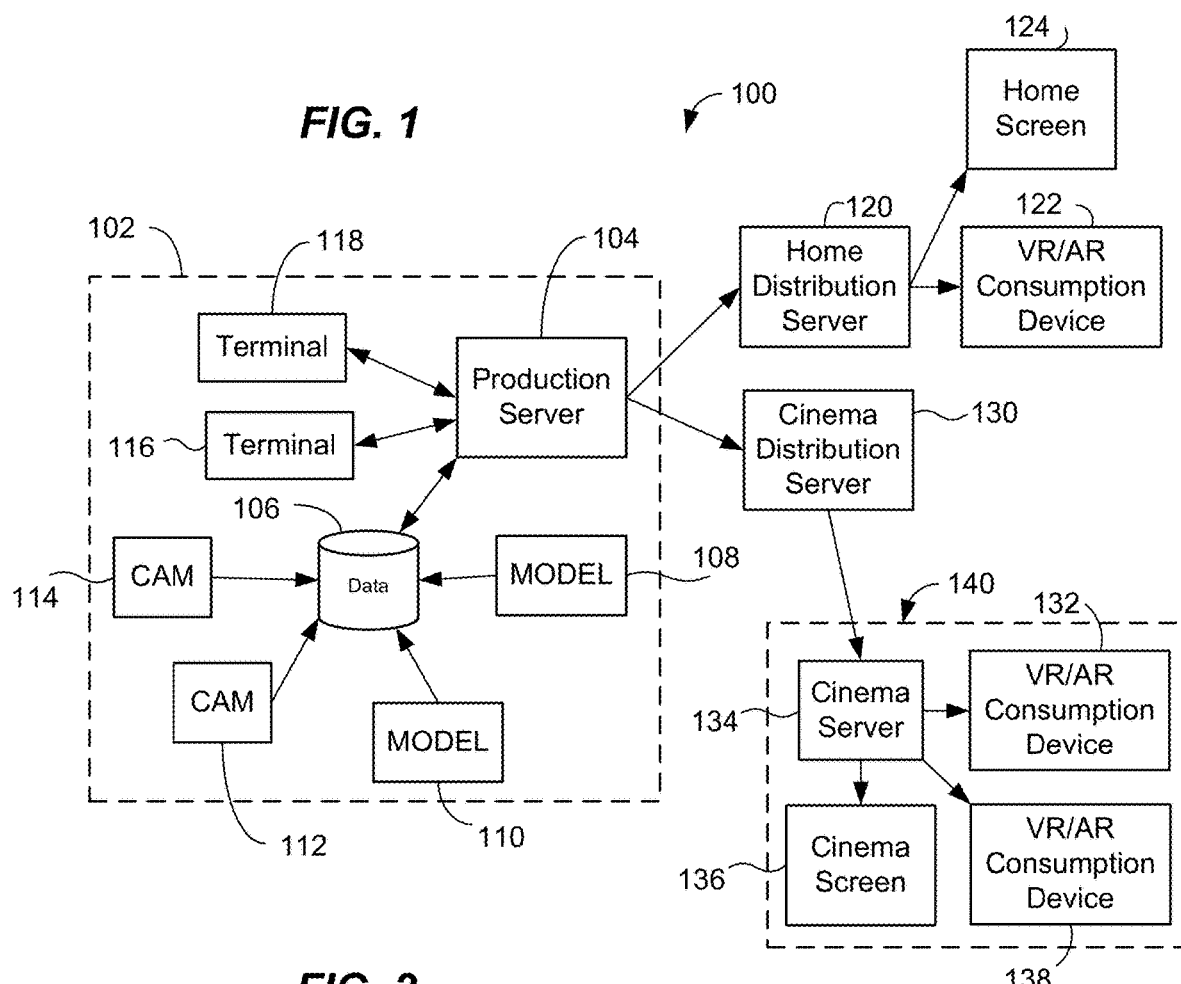
FIG. 1 is a schematic block diagram illustrating aspects of a system and apparatus for the production and configuration of digital data for virtual reality or augmented reality output coupled to a distribution system.

An illustrative system 100 for production and distribution of immersive content (e.g., AR and VR) in coordination with non-immersive content (e.g., 2D video with audio, stereoscopic 3D video with audio, non-immersive video games) is shown in FIG. 1. The system 100 may include a set 102 of production activities that produce assets that are shared and used in different ways across related different versions (immersive and non-immersive) of underlying creative content. Creative content includes, for example, video data collected by various camera systems 112, 112, audio data collected and/or generated by audio subsystems (not shown), and computer modeling/animation data created and arranged from various modeling/animation subsystems 108, 110. Creative content may be stored in a data store 106. It should be appreciated that the system may include several different data stores (not shown). A production server component 104, which may comprise a family of production applications operating over a computer network, may access data in the data store 106 under control of various production staff controlling the production process via multiple access terminals 118, 116. The number of components shown in system 100 is merely illustrative. It should be appreciated that a typical feature film or other studio production system will typically include a much larger number of components than illustrated. Creative and technical directors oversee the assembly of creative content from the various data sources, configured for immersive output devices and more traditional non-immersive devices.

Digital content produced by the system may include various versions of the same story, for example, a 2D theater version; a 2D home theater version; a mobile device version; stereoscopic 3D version for one or more of theater, home or mobile devices, a VR version for an in-theater experience, optionally in conjunction with supporting 2D or stereoscopic 3D content, a VR version for home use, likewise optionally for use with non-immersive content; an AR version for supplementing non-immersive content in a theater, an AR version for supplementing non-immersive content in a home theater environment or in a mobile device format, and video game content in one or more of the foregoing output formats. Finished productions in each of the various versions may be provided to a home distribution server 120 which may store the different versions in a content data store (not shown) in association with metadata for managing use and distribution. At least one set of consumers may receive multiple versions of immersive and non-immersive content in a single digital content (media) package, whether stored under control of a network served 120, or locally on a computer-readable medium such as an optical disc or memory device.

Different distribution channels each assigned its own server resources may be used to provide content to different sets of end users. For example, a cinema distribution server 130 may distribute immersive and conventional content to cinemas for public performance. For illustrative clarity, one cinema 140 of potentially many cinemas is diagrammed. Each cinema 140 may include at least one server 134 used to distribute digital content to one or more theaters each hosting a performance. Each theater (or the theater, if only a single theater is served by the server 143) includes a cinema screen 136 and one or more viewers each wearing an immersive content consumption device, 132, 138, for example, a VR visor or AR headset. The same underlying audio-video program may thereby be distributed in different versions for home and cinema use. Both home and cinema versions may include technical elements that coordinate different immersive devices contemporaneously playing the audio-video program in an immersive format. In addition, both versions may include elements that coordinate play of immersive content with contemporaneous or non-contemporaneous content playing In some embodiments, a media package holding coordinated immersive and non-immersive content may be, or may include, a single computer-readable medium (for example, an optical disc medium or FLASH memory device) in which packaged digital content is stored together. Distribution of a non-transitory, tangible and portable storage medium may reduce network bandwidth demands and ensure reliable and seamless access to dense digital content by the consumption device. In some embodiments, rapid distribution to tangible media may be accomplished by distribution from selected kiosks holding electronic copies of digital content for writing to digital copies. In an alternative, such kiosks may take advantage of high-bandwidth connections to obtain the electronic content for distribution. In other embodiments, including for example for cinema distribution, the electronic content may be transmitted over a communications network and/or computer network and stored directly on a memory device or medium connected to or integrated with a client device that will participate in playback of the received content.

Figure 2:
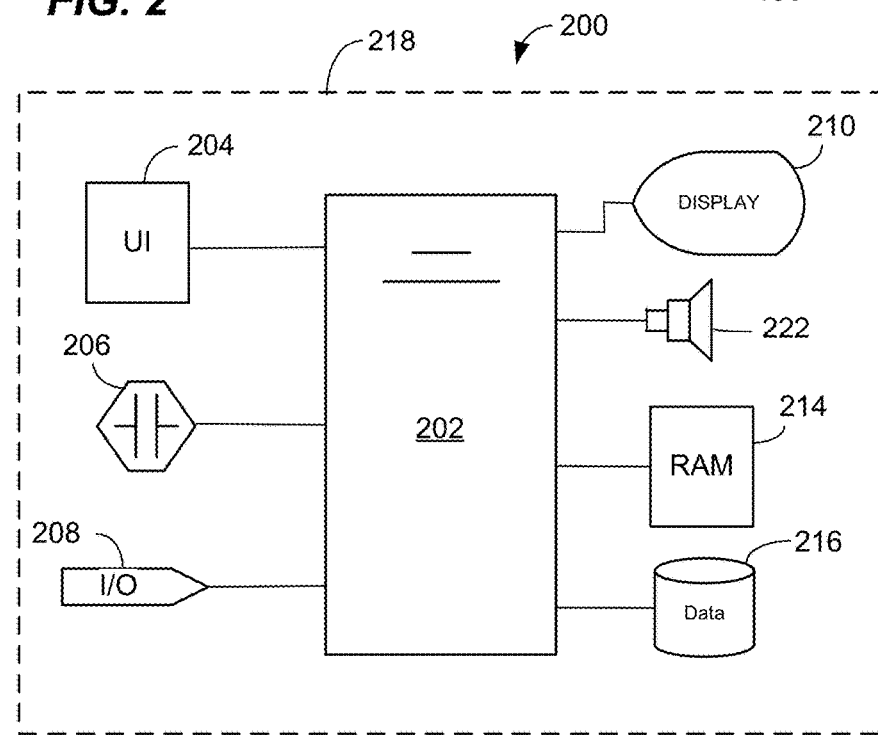
FIG. 2 is a schematic block diagram illustrating more detailed aspects of an apparatus for outputting virtual reality or augmented reality content.

Referring to FIG. 2, aspects of a content consumption device 200 for consuming VR or AR content are illustrated. Several viewers of a home theater or cinema presentation may be equipped with the content consumption device. The apparatus 200 may include, for example, a processor 202, for example a central processing unit based on 80×86 architecture as designed by Intel™ or AMD™, a system-on-a-chip as designed by ARM™, or any other suitable microprocessor. The processor 202 may be communicatively coupled to auxiliary devices or modules of the 3D environment apparatus 200, using a bus or other coupling. Optionally, the processor 202 and some or all of its coupled auxiliary devices or modules (examples of which are depicted at 204-216) may be housed within or coupled to a housing 218, for example, a housing having a form factor of a personal computer, gaming console, smart phone, notepad computer, laptop computer, set-top box, wearable googles, glasses, or visors, or other form factor.

A user interface device 204 may be coupled to the processor 202 for providing user control input to an immersive content display process operated by a VR or AR immersive display engine executing on the processor 202. User control input may include, for example, selections from a graphical user interface or other input (e.g., textual or directional commands) generated via a touch screen, keyboard, pointing device (e.g., game controller), microphone, motion sensor, camera, or some combination of these or other input devices. Control input may also be provided via a sensor 206 coupled to the processor 202. A sensor may comprise, for example, a motion sensor (e.g., an accelerometer), a position sensor, a biometric temperature or pulse sensor, a location sensor (for example, a Global Positioning System (GPS) receiver and controller), a multi-camera tracking sensor/controller such as, for example, available from Microsoft™ under the brand Kinect™, an eye-tracking sensor, or a microphone. The sensor 206 may detect a motion or other state of a user interface display, for example, motion of a virtual-reality headset, or the bodily state of the user, for example, facial expression, skin temperature, pupil dilation, respiration rate, muscle tension, nervous system activity, or pulse.

The device 200 may optionally include an input/output port 208 coupled to the processor 202, to enable communication between a VR/AR engine and a computer network, for example a cinema content server or home theater server. Such communication may be used, for example, to enable multiplayer VR or AR experiences, including but not limited to shared immersive experiencing of cinematic content. The system may also be used for non-cinematic multi-user applications, for example social networking, group entertainment experiences, instructional environments, video gaming, and so forth.

A display 220 may be coupled to the processor 202, for example via a graphics processing unit (not shown) integrated in the processor 202 or in a separate chip. The display 210 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 210 may be incorporated into a virtual reality headset or other immersive display system. Video output driven by a VR/AR immersive display engine operating on the processor 202, or other application for coordinating user inputs with an immersive content display and/or generating the display, may be provided to the display device 210 and output as a video display to the user (also referred to herein as the "player"). Similarly, an amplifier/speaker or other audio output transducer 222 may be coupled to the processor 202 via an audio processing system. Audio output correlated to the video output and generated by the VR/AR display engine or other application may be provided to the audio transducer 222 and output as audible sound to the user.

The 3D environment apparatus 200 may further include a random access memory (RAM) 214 holding program instructions and data for rapid execution or processing by the processor during controlling a 3D environment. When the device 200 is powered off or in an inactive state, program instructions and data may be stored in a long-term memory, for example, a non-volatile magnetic, optical, or electronic memory storage device 216. Either or both of the RAM 214 or the storage device 216 may comprise a non-transitory computer-readable medium or memory holding program instructions, that when executed by the processor 202, cause the device 200 to perform a method or operations as described herein. Program instructions may be encoded in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Immersive content may be played with non-immersive content in cinema and home theater settings, to augment conventional content that is displayed on a 2D screen and viewed using no equipment at all or stereoscopic viewing glasses. Mixed immersive and on-immersive media, one form of which consists of at least one of AR or VR data for displaying one of an AR output object or a VR output object contemporaneously with video data formatted for display on a 2D screen, may be referred to herein as "mixed media," "mixed AR or VR plus 2D media," or similar phraseology. Mixed media may become an important use case for both immersive and non-immersive content, for many reasons. For one, mixed media for the dramatic arts, properly done, is more versatile than purely immersive content, because the dramatic content can be enjoyed both in the traditional way on a screen, or enhanced using an AR device together with a screen, or using a VR apparatus and virtual screen. This versatility may reward the producer of the mixed media content with greater economic opportunities than producing single-platform content. Furthermore, even if AR or VR becomes dominant, some consumers may still prefer to consume 2D content without wearing immersive gear for various reasons, some of which are difficult to foresee and will depend on how the AR and VR technology and consumer tastes develop, among other things. Nonetheless, for the foreseeable future, production and distribution costs for quality, high-resolution VR content may constrain its growth and cause much content to be produced primarily for 2D screens. AT the same time, AR and VR may become more important in the coming decades and coexist with 2D screens for some indefinite period. The speed and extent to which AR or VR platforms will displace 2D screens cannot be exactly predicted, and it is anticipated that consumer demand for mixed media will exist for at least a transition period.

Figure 3:
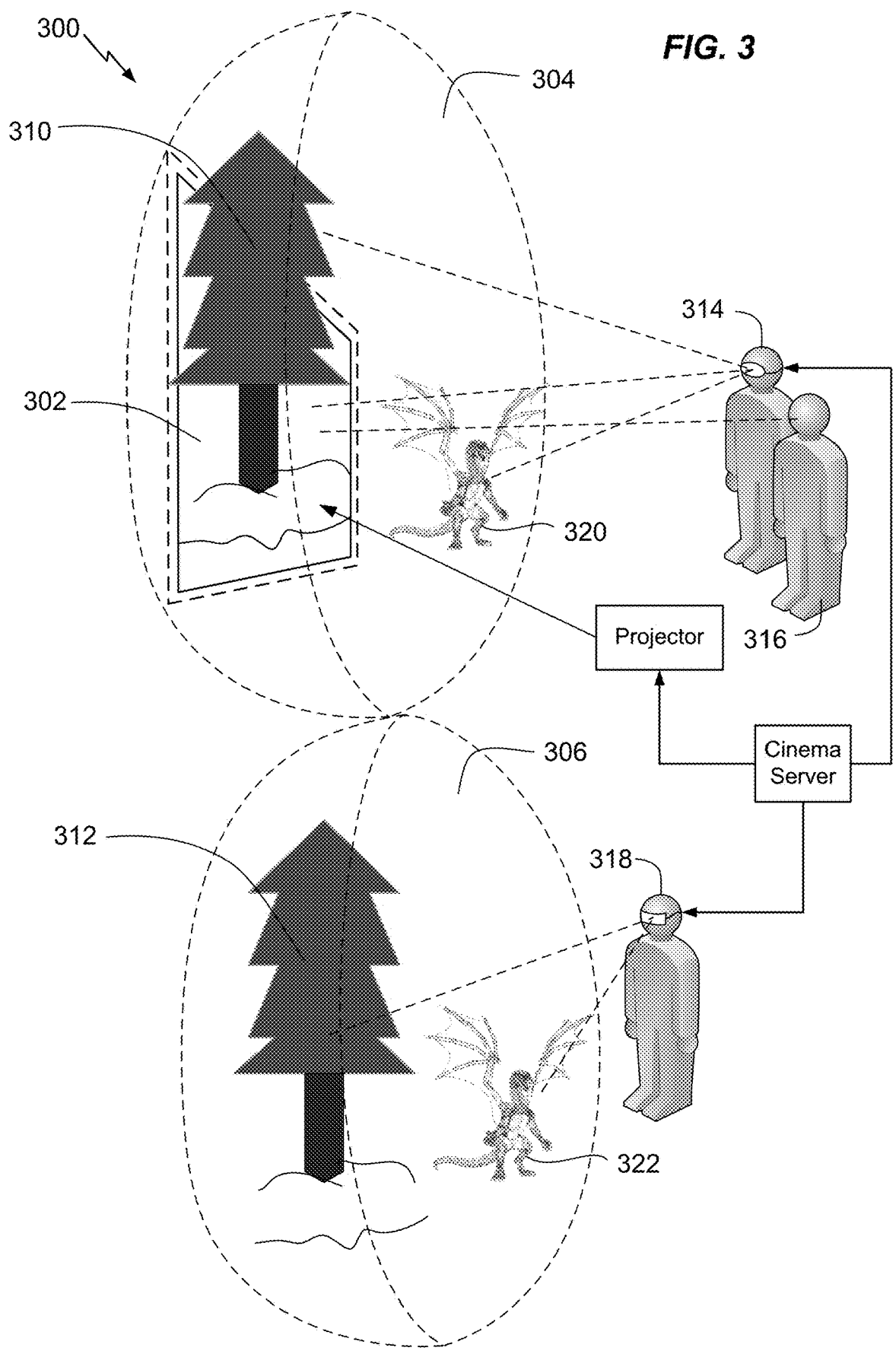
FIG. 3 is a schematic diagram illustrating aspects of viewing coordinated immersive and non-immersive content from the perspective of different viewers.

FIG. 3 illustrates aspects of augmented content using AR or VR in a viewing space 300 shared by multiple users 314, 316 and 318. A first user 314 wearing an AR headset views a content object 310 ("tree") partially on the screen 302 and partially in an augmented view volume 304 surrounding the screen 302. A second user 316 is viewing the screen 302 with "naked eyes" and no equipment, and sees only the partial view of the object 310 as depicted on the screen 302. The second user 316 sees nothing except the actual physical surroundings (e.g., a movie theater or room) in the area surrounding the screen 302.

A third user 318 using a VR headset does not see the screen 302 at all. Instead, the third user sees an equivalent content object 312 for the object 310 displayed in the screen 302. The object 312 may be located in the user's VR space 306 in a position relative to the user 318 that is closely equivalent to the position of the object 310 relative to the users 314, 316 (i.e., subjectively placed). Hence, all users 314, 316 and 318 may share the experience of at least the content playing on the screen 302, while users 314 and 318 equipped with AR or VR output devices can enjoy enhanced content at the same time that non-equipped user 316 is watching content on the screen 302 only. Both the AR-equipped user 314 and the VR-equipped user 318 may view objects that appear in front of, above, below, or to a side of the screen. For example, the AR-equipped user 314 may see the dragon 320, while the VR-equipped user 318 sees an equivalent dragon 322. Each user sees the immersive-only objects 320, 322 in their own frame of reference, in the illustrated example, referred to herein as subjective display.

Coordinating output on a 2D screen with VR output may provide several benefits which are not immediately apparent. For example, VR-equipped or AR-equipped audience members and non-equipped audience members can share a viewing experience together, increasing opportunities for social interaction before, during and after the shared experience. In addition, members of the audience who find the VR experience too emotionally intense or experience unpleasant sensations such as vertigo can temporarily remove their headsets without interrupting their viewing of the story. In alternative, or in addition, the VR or AR headset may be equipped to easily switch between immersive and non-immersive mode without interrupting play. However, such switching will not address all reasons why a user may wish to remove immersive gear during a performance. Audience members may desire to temporarily remove their headsets for other reasons, such as to interact with another audience member, enjoy a snack, adjust a fitting, relieve themselves of the head weight, cool their heads, or to walk to the restroom or concession stand, while following the action on the 2D screen.

Yet another benefit to theater owners is the ability to accommodate different tiers of ticket prices within the same facility. Currently, for example, audiences paying higher ticket prices to enjoy stereoscopic 3D content must be accommodated in a different theater than those paying lower prices to enjoy 2D content, requiring expensive duplication of physical facilities. In a coordinated 2D plus AR or VR system, a theater operator can implement tiered pricing for viewing content in the same viewing room. For example, the operator may charge a basic ticket price for access to the theater, a separate fee for connecting a patron's AR or VR equipment to the theater's immersive data stream, and another separate fee for renting AR or VR equipment to patrons who do not bring their own equipment.

Referring to FIG. 4, a system 400 for providing immersive and non-immersive content is illustrated in block form. Elements of the system 400 include a data source 408, coupled to a data distribution server 422. In a cinema or home theater application, one or more immersive output devices, for example a VR immersive output device 404 and an AR immersive output device 406, are in communication with the server 422. Each output device may be coupled to a corresponding user input device 405, 407. The user input devices 405, 407 may include one or more position, orientation, biometric or motion sensors coupled to a user's body, and/or a control panel operable by user manipulation or other bodily input. Information derived from such sensors may be provided to components of the server 422. Contemporaneously with providing data streams to the output devices 404, 406, the server 422 may also provide a data stream to a projector 420 or other 2D display device, for example an electronic display screen.

Data of various types may be obtained by the server 422 from the data source 408. These types may include 2D data 412 for example a digital video file or streaming feed, audio data (not shown) for display on a real or virtual screen, AR data 414 for augmenting the 2D data using an AR output device 406, VR data 416 for providing a parallel or supplemental entertainment experience using a VR output device 404, and a distribution application 418 for managing distribution of the aforementioned data from the server 422. The server 422 may execute the application 418, which when executed may provide various functional modules. The modules may include a distribution module 424 for managing communication with and distribution to multiple output devices. The modules may include a decryption and decoding module 426 for managing content security and providing streaming data in a device-useable form. The modules may include a content coordination module 428 for maintaining coordination between entertainment content streamed to different output devices, a customization module 430 for enabling content to be customized for a particular output device, for example in the case of interactive content. The modules may include a metrics module 432 for collecting feedback from immersive output devices 404, 406, which may be anonymized and used to analyze use patterns with the aim of providing more effective and compelling content for immersive output, for tracking user preferences, or other purposes.

Narrative content represented by, for example, a motion picture script, may be produced for both immersive and non-immersive output devices. Referring to FIG. 5A, general aspects 500 of packaging immersive and non-immersive content in a media package 502 are illustrated. The media package 502 may be, or may include, a particular article, such as computer-readable optical disk or memory device. In the alternative, the package 502 may be, or may include, a set of data maintained on a server for which access rights are granted to a particular user account. In either case, the combining of immersive and non-immersive content as exemplified by the media package 502 is designed to appeal to a consumer desiring to obtain access to immersive content 508 and non-immersive content 510 on different devices, whether at home or in a public theater. For example, the consumer may desire to watch non-immersive content 510 on a video display screen of a mobile or larger device, and immersive content 508 using a head set or other device that provides access to VR or AR content.

The non-immersive content 510 may be recorded according to a non-immersive narrative 506, for example, a traditional script. The immersive content 508 may be recorded according to an immersive narrative ruleset 504, such as, for example, a branching narrative of some kind, or in the alternative, the same script as the non-immersive content. Both the immersive narrative ruleset 504 and the non-immersive narrative 506 may be an expression of a narrative backbone. For example, the narrative backbone may include the entire narrative ruleset 504, while the non-immersive narrative 506 may be a subset of the backbone 512, containing only selected critical narrative events arranged in a particular narrative sequence.

Figure 5B:
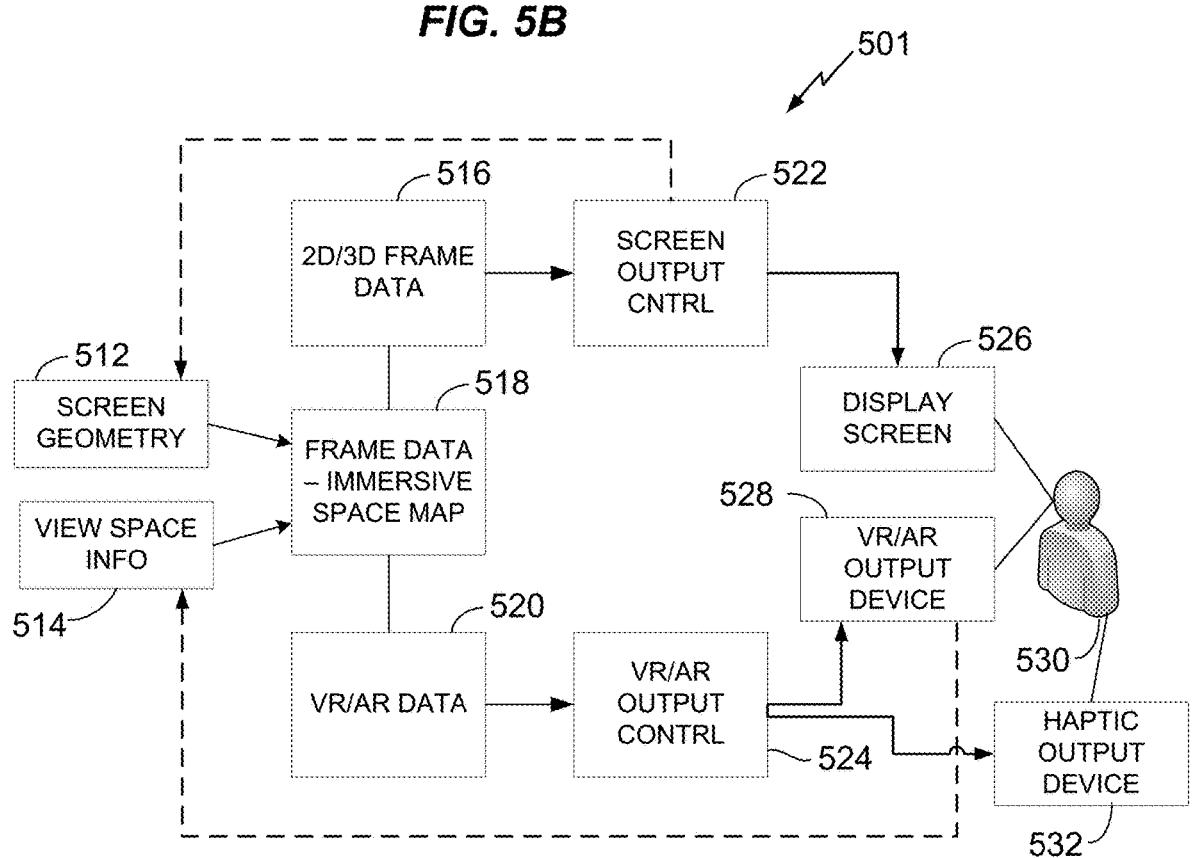
FIG. 5B is a block diagram illustrating aspects of a content display system including coordinated output of immersive and non-immersive content.

In an aspect, immersive content 508 and non-immersive content 510 may be coordinated for consumption by playback in parallel. FIG. 5B illustrates aspects of parallel consumption 501 using coordinated output devices. The different output devices may obtain content from common source, for example from a content server via a local area network or wireless local area network in a cinema or home theater. A first output device for non-immersive content may include a 2D display screen 526. A second output device 528 may be configured for providing AR or VR. The different output devices 526, 528 may be in use by the same user 530, or by different users (not shown) occupying a shared space.

A data source may supply at least three types of data from a media package: 2D or stereographic 3D frame data 516, VR or AR data 520, and a map 518 that relates the frame data 516 and the VR/AR data 520. Use of the map 518 may change as a function of screen geometry data 512 from the screen output controller 522, and geometry data defining the view space 514, for example a position and orientation of the viewer 530 relative to the display screen 526 from sensors in the VR/AR output device 528. The screen output controller 522 may play frame data in a conventional fashion for output on the display screen 526. While viewing the output on the display screen 526, the user may also view output on the VR/AR device 528. In a VR mode, the output device 528 may duplicate the view on the screen 526 and add additional surrounding imagery and interactive content. In an AR mode, the output device 528 may augment the display 526 with surrounding imagery or interactive content. Using VR or AR content keyed to non-immersive content in a media package, a suitably equipped user can thus greatly expand the viewing area and number of interactive objects that can be experienced in connection with the narrative content, relative to the content displayed on the display screen 526. The VR/AR output controller 524 may keep the VR or AR output synchronized with play of the frame data 516, via the map 518 and geometry data 512, 514. The VR/AR output controller 524 may also generate signals for controlling a haptic output device 532, for example, an oscillator or pneumatically-activated pressure reservoir.

Figure 6:
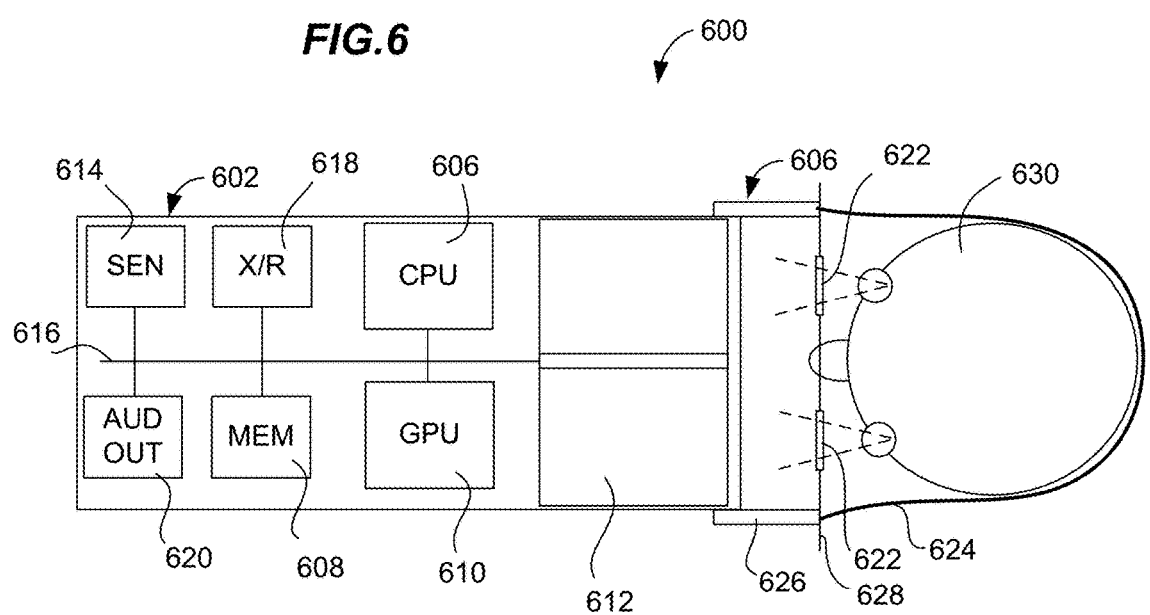
FIG. 6 is a schematic diagram illustrating components of a stereoscopic display device for providing an immersive VR experience.

Any of the features described herein may be executed by an application for providing a 3D environment responsive to user input that produces VR output for an immersive VR headset or the like. FIG. 6 is a schematic diagram illustrating one type of an immersive VR stereoscopic display device 600 may be provided in various form factors, of which device 600 provides but one example. The innovative methods, apparatus and systems are not necessarily limited to a particular form factor of immersive VR display, but may be used in a video output device that enables the user to control a position or point of view of video content playing on the device. Likewise, a VR or AR output device may manage an audio position or point of view of audio content playing on the device. The immersive VR stereoscopic display device 600 represents an example of a relatively low-cost device designed for consumer use.

The immersive VR stereoscopic display device 600 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. This modular design may avoid the need for dedicated electronic components for video output, greatly reducing the cost. The device 600 is designed to be worn close to the user's face, enabling a wide field of view using a small screen size such as typically found in present handheld tablet computing or smartphone devices. The support structure 626 may provide a fixed mounting for a pair of lenses 622 held in relation to the display screen 612. The lenses may be configured to enable the user to comfortably focus on the display screen 612 which may be held approximately one to three inches from the user's eyes.

The device 600 may further include a viewing shroud (not shown) coupled to the support structure 626 and configured of a soft, flexible or other suitable opaque material for form fitting to the user's face and blocking outside light. The shroud may be configured to ensure that the only visible light source to the user is the display screen 612, enhancing the immersive effect of using the device 600. A screen divider may be used to separate the screen 612 into independently driven stereoscopic regions, each of which is visible only through a corresponding one of the lenses 622. Hence, the immersive VR stereoscopic display device 600 may be used to provide stereoscopic display output, providing a more realistic perception of 3D space for the user. Two separate displays can also be used to provide independent images to the user's left and right eyes respectively. It should be appreciated that the present technology may be used for, but is not necessarily limited to, stereoscopic video output.

The immersive VR stereoscopic display device 600 may further comprise a bridge (not shown) for positioning over the user's nose, to facilitate accurate positioning of the lenses 622 with respect to the user's eyes. The device 600 may further comprise an elastic strap or band 624, or other headwear for fitting around the user's head and holding the device 600 to the user's head.

The immersive VR stereoscopic display device 600 may include additional electronic components of a display and communications unit 602 (e.g., a tablet computer or smartphone) in relation to a user's head 630. A support structure 604 holds the display and communications unit 602 using restraining device 624 that is elastic and/or adjustable to provide a comfortable and secure snug fit, for example, adjustable headgear. When wearing the support 602, the user views the display 612 though the pair of lenses 622. The display 612 may be driven by the Central Processing Unit (CPU) 602 and/or Graphics Processing Unit (GPU) 610 via an internal bus 616. Components of the display and communications unit 602 may further include, for example, a transmit/receive component or components 618, enabling wireless communication between the CPU and an external server via a wireless coupling. The transmit/receive component 618 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 618 may enable streaming of video data to the display and communications unit 602 from a local or remote video server, and uplink transmission of sensor and other data to the local or remote video server for control or audience response techniques as described herein.

Components of the display and communications unit 602 may further include, for example, one or more sensors 614 coupled to the CPU 606 via the communications bus 616. Such sensors may include, for example, an accelerometer/inclinometer array providing orientation data for indicating an orientation of the display and communications unit 602. As the display and communications unit 602 is fixed to the user's head 630, this data may also be calibrated to indicate an orientation of the head 630. The one or more sensors 614 may further include, for example, a Global Positioning System (GPS) sensor indicating a geographic position of the user. The one or more sensors 614 may further include, for example, a camera or image sensor positioned to detect an orientation of one or more of the user's eyes. In some embodiments, a cameras, image sensor, or other sensor configured to detect a user's eyes or eye movements may be mounted in the support structure 626 and coupled to the CPU 606 via the bus 616 and a serial bus port (not shown), for example, a Universal Serial Bus (USB) or other suitable communications port. The one or more sensors 614 may further include, for example, an interferometer positioned in the support structure 604 and configured to indicate a surface contour to the user's eyes. The one or more sensors 614 may further include, for example, a microphone, array or microphones, or other audio input transducer for detecting spoken user commands or verbal and non-verbal audible reactions to display output. The one or more sensors may include, for example, electrodes or microphone to sense heart rate, a temperature sensor configured for sensing skin or body temperature of the user, an image sensor coupled to an analysis module to detect facial expression or pupil dilation, a microphone to detect verbal and nonverbal utterances, or other biometric sensors for collecting biofeedback data.

For immersive VR or similar output modalities, the story content of a movie or the like may be enhanced, without eliminating the essence of scripted entertainment that a participant or user (who is visually, aurally and cognitively immersed) can more or less passively enjoy. For example, allowing users to move the viewpoint to see items occluded in the main view as a scene unfolds may enable such users to absorb dramatic details that enhance understanding of the plot, add emotional impact, foreshadow events to come, or otherwise enhance enjoyment of a scripted storyline. An example of foregoing is enhancing story telling by user-selected depth of focus about feedback loops among an interactive VR narrative (or whatever form the narrative takes), and at least two sense modalities plus one cognitive item. These modalities may supplement rather than replace conventional cinema viewing techniques, such that some patrons may view a conventional on-screen version of the same feature, while other patrons who desire a more immersive experience can wear immersive headgear in the same theater as the conventional patrons and contemporaneously enjoy access to the supplemental immersive features.

Sensor data from the one or more sensors may be processed locally by the CPU to control display output, and/or transmitted to a server for processing by the server in real time, or for non-real time processing. As used herein, "real time" refers to processing responsive to user input that controls display output without any arbitrary delay; that is, that reacts as soon as technically feasible. "Non-real time" refers to batch processing or other use of sensor data that is not used to provide immediate control input for controlling the display, but that may control the display after some arbitrary amount of delay.

Components of the display and communications unit 602 may further include, for example, an audio output transducer 620, for example a speaker or piezoelectric transducer in the display and communications unit 602 or audio output port for headphones or other audio output transducer mounted in headgear 624 or the like. The audio output device may provide surround sound, multichannel audio, so-called 'object oriented audio', or other audio track output accompanying a stereoscopic immersive VR video display content. Components of the display and communications unit 602 may further include, for example, a memory device 608 coupled to the CPU 606 via a memory bus. The memory 608 may store, for example, program instructions that when executed by the processor cause the apparatus 600 to perform operations as described herein. The memory 608 may also store data, for example, audio-video data in a library or buffered during streaming operations. Further details regarding generation and use of VR environments may be as described in U.S. Provisional Patent Application Ser. No. 62/088,496, filed Dec. 5, 2014, which is incorporated herein in its entirety by reference.

Figure 7:
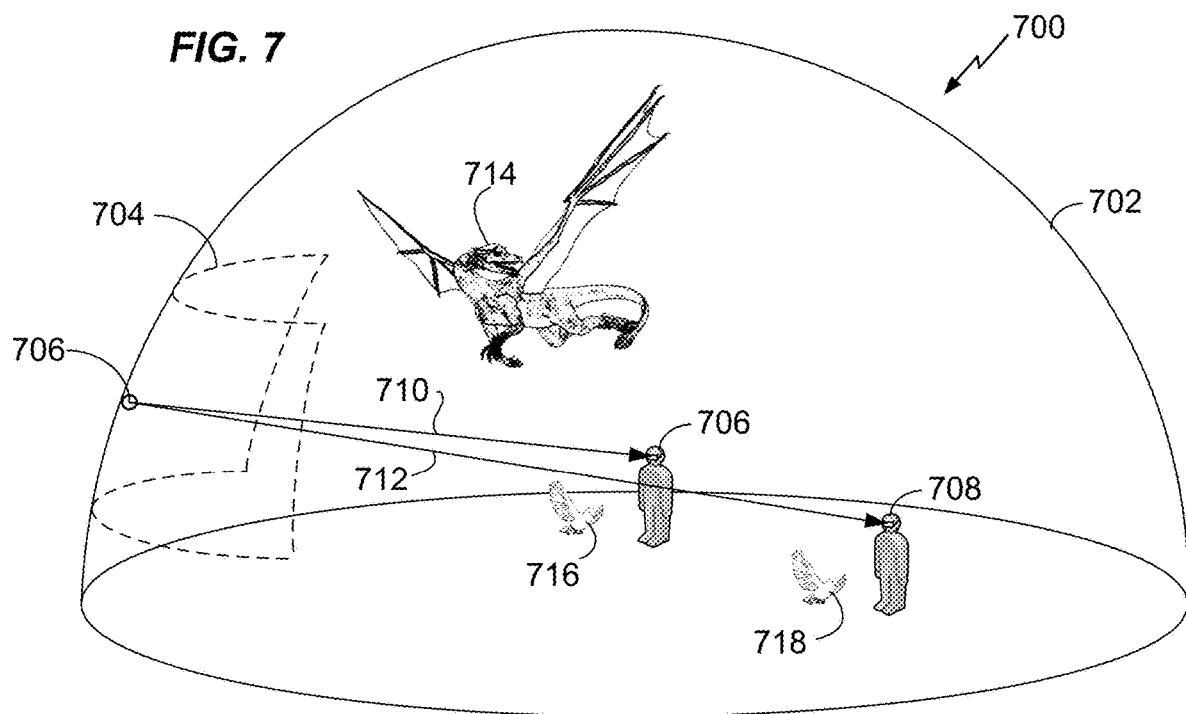
FIG. 7 is a diagram illustrating components of, and concepts concerning, a cinema or home theater space for multi-user VR or AR.

FIG. 7 illustrates geometrical aspect of a display environment 700 for coordinated immersive and non-immersive content, including a real or virtual display screen 704 and a virtual envelope or shell 702 used as a virtual projection surface for rendering the background of a scene in a way that blends smoothly with a projection surface. While shown as a hemispherical dome, it should be appreciated that the shell 702 may be provided in a variety of shapes. Closed curves without sharp edges may be suited for most shell geometries. FIG. 7 shows a bottom edge to the shell 702 for illustrative clarity, but it should be appreciated that transitions between shell surfaces should generally be curved to avoid rendering artifacts. The shell 702 encloses a volume that may be referred to herein as the "view space volume" or similar terminology, in which the action of the scene occurs. It should be appreciated, however, that the shell need not entirely surround the viewer. For example, a shell 702 may extend above or to the sides of a flat display screen without any curvature, may curve towards the audience but not all the way around the audience, or may be untextured and invisible in selected areas. The shell 702 is an example of a virtual projection surface. A virtual projection surface may also be referred to herein as a "virtual 2D screen" or "virtual screen," and may be configured in any useful surface geometry, including for example flat planar, arcuate planar, or polygonal (e.g., cubic or pyramidal).

In implementations using 100% rendered output, use of a shell 702 is optional, because rendering may be based on a model with an infinite extent. However, use of a textured shell may provide the advantage of faster render times and facilitate (by simplifying computations) rendering of the transition area around a 2D screen 704, for AR applications. Background images may be rendered on the shell using simple "ambient" shading, which does not require any raytracing or raytracing approximation for determining surface appearance, except for computing a visible portion of surface from the rendered viewpoint. Instead, each pixel is rendered at a specified color and brightness "baked" into a 2D texture supplied for the geometry shell, based on an aggregate of the 2D texture's pixels that corresponds to a rendered pixel. The level of brightness or white balance of the baked texture may be adjusted in a computationally efficient batch or real-time process to match screen characteristics of a particular theater. The effect may be as if the extent of the display screen were extended over the entire textured portion of the shell 702. Selected portions of the shell 702 may be left untextured and unrendered for any desired reason, for example, for dramatic focus, to manage production costs, or for facility safety. It should be appreciated that a theater may include more than one screen 704, if desired.

The shell 702 does not necessarily coincide with the interior of the theater or room on which the screen 704 exists or in which the viewers 706, 708 are situated. AR output devices are characterized by allowing a user to view her actual environment while overlying the view with objects rendered to as to appear inside the actual environment. Where an AR object is rendered, the actual environment is obscured. Therefore, if it is desired to create an illusion that transforms a real object into a rendered object in the AR view, it is necessary to completely obscure the real object with a rendered object. For example, if it is desired to replace a wall of the theater with part of a geometry shell 702 on which a scene background is rendered, the shell needs to obscure the entire wall. However, if the shell is positioned in the AR space beyond the actual wall, the rendered background may not cover the entire wall unless the shell is completely closed. Objects rendered in the view space volume may appear partly against the background, and partly against real structures in the theater, detracting from the intended illusion. If the shell is completely closed and rendered visible, the entire field of view of the user will be a rendered view, and thus, the effect is that of VR and not AR, in the sense that "AR" is used in the present disclosure. Accordingly, for AR output, the shell may be generated to fit inside the viewing room, to avoid diminishing the realism of the immersive AR experience by creating unintended effects such as objects seeming to pass through walls. As such, the shell 702 should exist as an objective feature for AR viewers, meaning it is placed based on the geometry of the viewing screen and room, such that each viewer has a different perspective view of the shell 702 depending on their respective positions in the theater.

For VR output, the shell may extend to any desired dimension and the screen 704 may be virtual, functioning mainly as a sort of focal point 706 or "home" defining a geometrical relationship between the viewer and the intended narrative focal point of a scene. For VR output, the shell may be objectively or subjectively placed, based on user or director preferences. When subjectively placed, each VR viewer may view the shell 702 from the same apparent starting position, which optionally may be varied individually for each used in response to user input. The geometry of the shell 702, and whether it is subjectively or objectively placed, may vary from scene to scene based on the dramatic objectives for each scene. These factors would usually be static for the duration of particular scenes. Transitions between shells of different shapes, and transitions between objective or subjective viewpoints of an object, are permitted and may be abrupt or gradual. A gradual transition may be implemented using an algorithm to generate a series of intermediate shapes or viewpoints bridging between the desired endpoints.

Each scene may have a static focal point 706, which in the case of a physical screen remains fixed from scene to scene. While the screen 704 is shown as highly curved, it should be appreciated that actual physical screens will usually have much less curvature, or no curvature. Flat or curved screens are both referred to herein as being 2D screens; that is, a 2D screen may be flat or curved. When a screen is flat or less curved, the shell 702 may be blended to match the curvature or flatness of the physical screen around its edges, if necessary. The shape of the screen 704 should be expected to vary from theater to theater. To enable use of the same content with screens and theaters of different sizes, a custom or semi-custom (meaning selected from a range of standard shapes and sizes) shell may be selected for each theater, and the custom or semi-custom shell excluding the screen 704 area textured and rendered at runtime based on a background texture file for the shell and the field of view of each viewer. For example, for each viewer, the server may select and transmit a portion of the background texture based on the current viewer field of view, plus some amount of additional area beyond the current field of view to accommodate an expected amount of head movement (which could be very slight, or vary depending on the speed by which principal objects are moving through the scene). Thus, each immersive output device need not be supplied with the entire background texture for every frame, if the background is changing from frame to frame. If the background or a portion thereof is static over several frames, it may be less resource-intensive to supply every output device with the entire background texture or the static portion for the set of frames, instead of selecting a currently viewed portion for individual viewers.

In AR-coordinated viewings, the screen 704 acts as a sort of dynamic background that changes in virtually every frame, but this portion of the output need not be supplied to the AR output device, because it is directly visible to the viewer. The surrounding background portion may be static or dynamic, depending on the scene. Also, the supplemental background placed on the shell 702 need not be supplied in every scene, whether for dramatic effect, to manage production costs, or for other reasons. For some scenes, the supplemental background may be limited to a relatively small portion adjacent to the screen 704, or may be entirely omitted. In general, if supplemental content is to be provided only for certain times of the performance, cue may be provided in advance of each such time, to alert viewers to put on and activate their immersive output devices. The cue may be in the form on an invisible transmission to the output device that may react in some way using haptic, audible, or visible output to alert the user. In an alternative, the cue may be provided in visible or audible form, for example as part of the program, or from an emitter from the AR output device or another device.

A geometrical relationship between the objective geometry for any given scene and each viewer wearing AR or VR gear may be defined by a vector 710, 712 from a fixed focal point 706 (e.g., a point at the center of the display screen) and each viewer, assuming that the viewer is gazing at the focal point so the view plane of the immersive device is perpendicular to each of the respective vectors 710, 712. Accordingly, to calibrate output devices at the beginning of a showing, the audience members wearing immersive gear may be instructed to gaze at a focal point 706 shown on screen, or several different points in turn, while each person's immersive head gear records a position and orientation of the gaze point. In addition, audience members may be instructed to perform other movements while position and orientation measurements are similarly taken and recorded by each person's immersive head gear. Optionally, individualized adjustments in brightness and white point may similarly be facilitated by measuring a white point and brightness of one or more screen areas, using a light sensor on each person's immersive head gear. The recorded measurement data may then be used to calculate an individualized viewpoint location, orientation and lighting parameter adjustment for each audience member wearing immersive gear. The system server may then record the location and base orientation for each viewer, or each immersive output device may record its own location and orientation relative to the theater's objective coordinate system, or both.

As already noted, the position of off-screen rendered objects may be specified using an objective coordinate system, for example a coordinate system having an origin at the focal point 706 or other location, and defined by set of coordinate axes from that origin. The flying dragon 714 provides an example of an objectively located off-screen object, for which each user's perspective is different. For example, if the objective coordinates for the dragon 714 indicate a position near the center of the view space volume, each user's immersive output device will output a rendering of the dragon positioned in the center of the theater. A user 706 positioned towards the right of the theater will see the dragon 714 to her left, while another user 708 positioned towards the left of the theater will see the dragon 714 to her right. In addition, off-screen objects may be specified relative to each user, based on respective subjective coordinate systems defined by each user's equipment during a calibration sequence. The birds 716, 718 provide examples of subjectively located off-screen objects, the position and orientation of which are specified in coordinates relative each viewer. Accordingly, both users will see their respective subjective off-screen objects (e.g., birds 716, 718) in the same position and orientation relative to themselves. It should be appreciated that user 706 will see bird 716 only, and not any other instance of the same subjective object, and likewise user 708 will see only her respective object 718. Whether or not a set of object coordinates is subjective or objective may be indicated by a bit flag. For example, objective coordinates may be indicated by a '1' value and subjective coordinates by a '0' value of the flag bit, or vice-versa, for one or more coordinate sets.

Figure 8A:
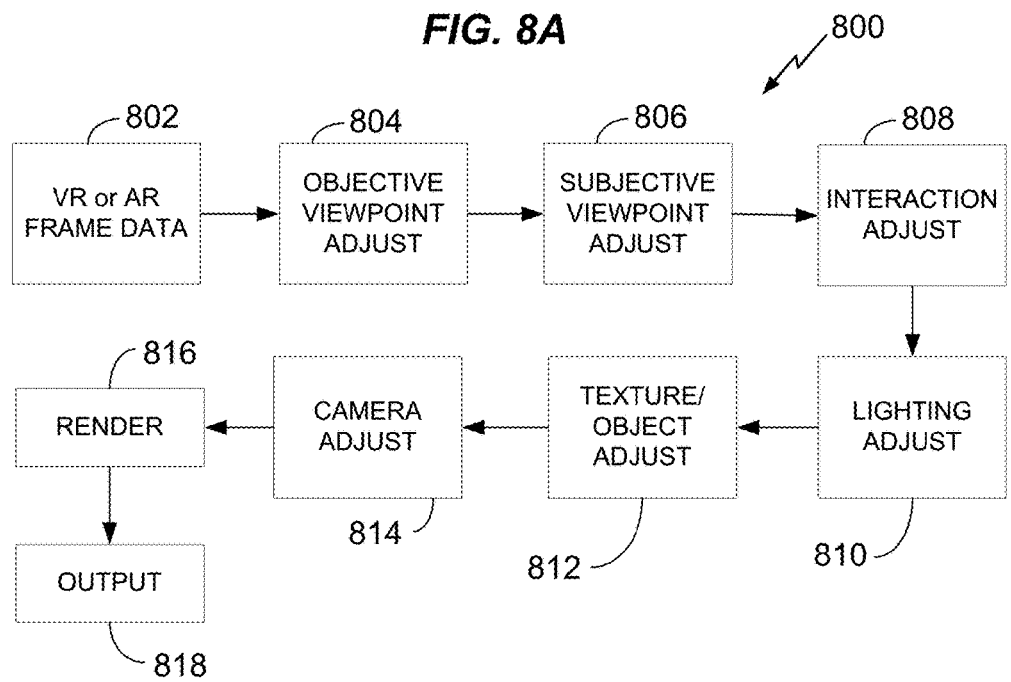
FIG. 8A is a flow chart illustrating elements of serving VR or AR data to an AR or VR output device providing a cinema experience.

Various adjustments to rendering parameters for immersive data may be applied between the common "standard" content source (e.g., digital cinematic master data) and the individualized rendering process by each user. FIG. 8A illustrates elements of a computer-implemented process 800 for making such adjustments. Any one or all of the illustrated elements of the process 800 may be individually performed by each user's immersive output equipment or (except for output of rendered immersive content) by a cinema server or network. Initially, at 802, immersive data in digital cinematic master data is obtained from any suitable data source and decrypted to obtain frame rendering parameters for each frame or set of frames. Such parameters may include, for example, shell objects and off-screen objects appearing in the scene, position and orientation of all objects to be rendered each associated with a set of position and orientation coordinates that are indicated as subjective or objective, associated object textures for rendered objects, lighting parameters, and camera parameters. Standard frame rendering parameters may then be adjusted for each frame or for sets of multiple contiguous frames, as necessary.

These adjustments may include a set of viewpoint adjustments 804, 806. Each of these viewpoint adjustments may include geometric adjustments as described in more detail herein below. For example, at 804, transforming objective coordinates for indicated objects to the coordinate system used by the applicable render engine for rendering a viewpoint. Generally, the transform 804 will transform an object's objective coordinates into the coordinates used by the applicable render engine for rendering immersive output for a particular immersive output device. The applicable render engine may be located variously, such as in a random access memory of an immersive device, in a local auxiliary device for the immersive output device, in a cinema server or server farm, or in a cloud computing resource. In any case, the coordinate transform will be based on the coordinates used by the render engine and calibration data establishing the geometrical relationship between each member of the audience and the theater's objective coordinates. Any suitable transform method as known in the art may be used for the coordinate transform.

The adjustments may further include, at 806, transforming subjective coordinates for indicated objects to the coordinate system used by the applicable render engine for rendering a viewpoint. In the trivial case, no transformation is needed because the common subjective values will work for every render engine, and are the same for every audience member. However, in some cases certain transformation may be needed to put subjective coordinates in proper condition for rendering, for example converting to a different type of coordinate system to facilitate a particular render engine or adding a fixed offset value to account for physical differences between users.

The adjustments may further include, at 808, adjusting a position or orientation of rendered objects based on user input, in the case of interactive objects. The appearance, position, or orientation of selected objects may depend on user input. The influence of user input may be limited to specified objects and ranges of change, to prevent disrupting the flow of a narrative performance and maintain contemporaneous audience members in sync.

The adjustments may further include, at 810, adjusting scene lighting parameters. In an aspect, position and orientation of scene lights may be designated objective or subjective, and transformed as needed like any other off screen object with respect to position and orientation coordinated. In addition, other lighting parameters, such as intensity or color, may also be adjusted so that the brightness and color of rendered scene elements matches the brightness and color of output on the theater's display screen.

The adjustments may further include, at 812, adjusting object texture, for example, applying an automatic level of detail based on a distance between the rendered viewpoint and each rendered object, or equivalent measure. Automatic level of detail provides less detailed texture maps for more distant objects, to improve rendering performance. Similarly, automatic level of detail adjustments may be used to select a mesh density for off screen objects based on distance from the viewpoint, again for rendering efficiency.

The adjustments may further include, at 814, adjusting camera parameters distinct from position and orientation, such as focal point, field of field, and aperture, based on immersive input. Hence, an immersive render engine may allow a user to "zoom in" or "zoom out" on the scene, with appropriate camera adjustments. In AR mode with a common display screen, such camera zoom may cause mismatch between the display screen 704 and rendered shell 702 or off-screen objects 714, 716, 718, and might be limited to rendering of views that exclude the display screen only. Once adjustments are made the render engine may render the scene at 816 and the rendered data may be displayed using an immersive output device at block 818.

In a theater environment with seated patrons, the location of each viewer may be relatively static, but the orientation of the viewer's head will vary throughout the show. The cinema distribution server may track locations and/or orientation data for managing consumption of bandwidth as mentioned above, or may ignore position and orientation information if the theater's information system can support the provision of full immersive environmental information to each user for every frame. If the bandwidth of the information system is sufficiently broad, and the computational power of the individual output devices is sufficiently high to render all immersive features in every frame, all computation of the individual views may be performed at the respective output devices. Assuming present trends in computing power and transmission bandwidth continue, it is likely that location and orientation tracking by a distribution server may at some point become unnecessary, unless for gathering statistical viewer metrics. In the interim, computational power may need to be allocated to the server side, for tasks such as managing bandwidth or providing high speed, high quality rendering in real time.

Figure 8B:
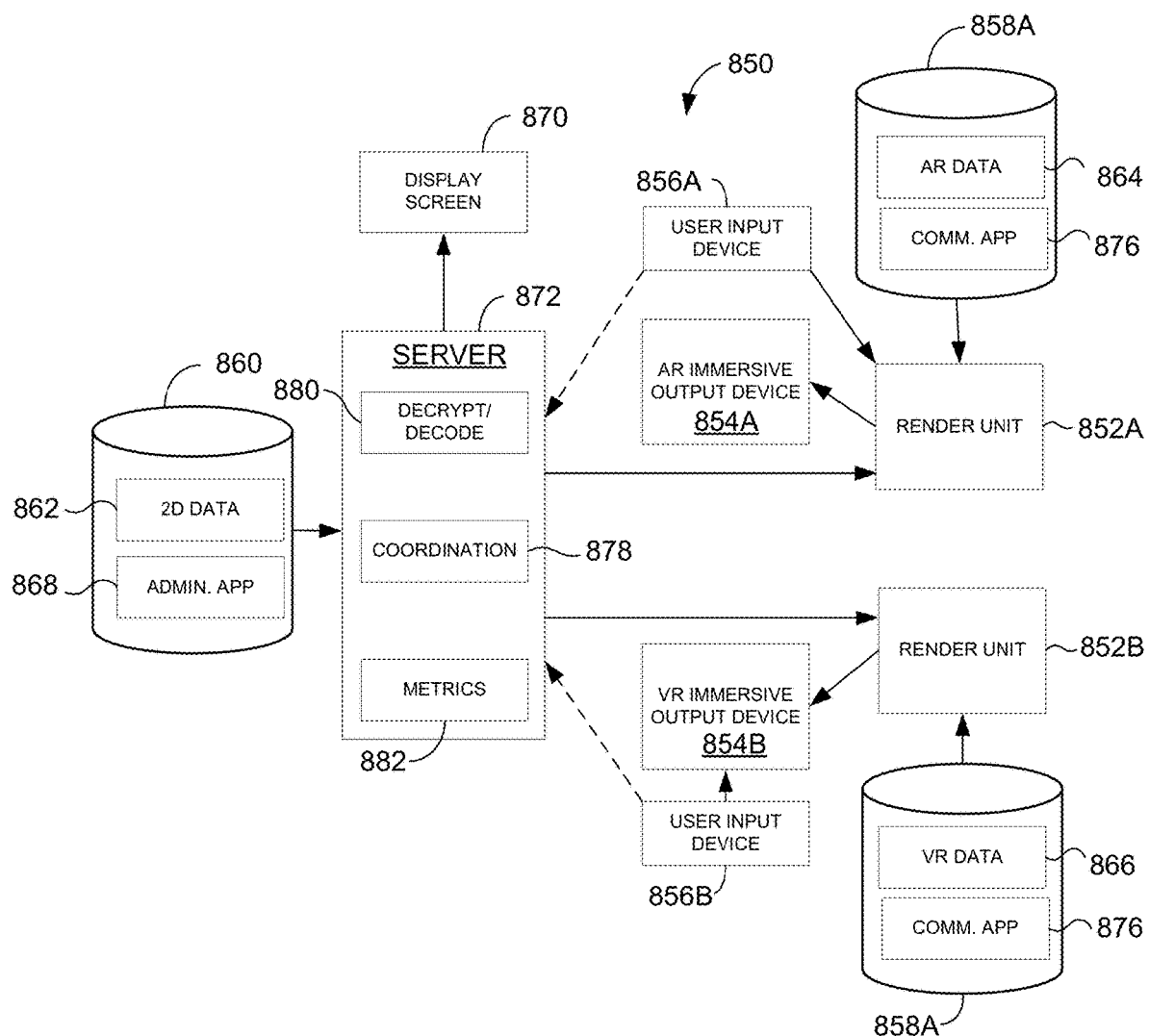
FIG. 8B is a concept diagram illustrating elements of a system for coordinating immersive content provided to multiple users in a cinema or home theater setting.

In another alternative embodiment 850 illustrated by FIG. 8B, an immersive and non-immersive content may be downloaded or otherwise provided to a plurality of dedicated memory devices 858A, 858B, each of which is attached to a respective one of the immersive output devices 856A, 856B via a high-bandwidth connection, such as, for example, a high-speed Universal Serial Bus (USB) or Serial Advanced Technology Attachment (SATA) connection. Each of the memory devices 858A, 858B may be incorporated into the output devices 856A, 856B, or installed in the theater and connected to the output devices 856A, 858B via a cable port at each chair and a corresponding one of the render control units 852A, 852B. The render units 852A, 852B may each be implemented to optimize efficiency and comfort depending on available technology, for example in a random access memory or specialized graphics hardware subsystem of an immersive device, in a locally sited auxiliary hardware and software component for the immersive output device (e.g., under a cinema seat), in a cinema server or server farm, or in a cloud computing resource. Each one of the render control units 852A, 852B may obtain the content from a respective one the memory devices 858A, 858B based on sensor data from a corresponding one of the immersive output devices 856A, 856B. The pace of the performance for the cinema system 850 may be controlled and coordinated between different audience members and a 2D display screen 870 by a signal from a cinema server 872, for example a wireless signal, generated by a coordination module 878. In these embodiments, content data is provided to each output device via respective high-bandwidth bus connections while control signals used for coordinating the program over all the audience can be provided in real time over a lower bandwidth wired or wireless interface. The content data 864, 866, 862 may be stored in encrypted form subject to a security system module 880 that only allows access during the theater presentation or at other authorized times. AR data 864 may be rendered for the AR output device 854A and VR data 866 may be rendered for the VR output device 854B. Sensor data from user input devices 856A, 856B may primarily be used to control rendering by the rendering units 852A, 852B and secondarily may be provided to a metrics component 882 for tracking aggregate audience reactions to immersive content. A communications software component 876 may be used to manage communications between render units 852A, 852B and server 872, output devices 854A, 854B and other system components. Likewise, an administrative software component 868 may manage overall system operation at server 872.

Although relieving bandwidth constraints on providing content data, providing the content over a bus may solve only half of the resource problem. Present graphics processors for rendering cinematic-quality, high resolution images in real time may have power consumption and space requirements that make them unsuitable for incorporating into wearable, mobile computing equipment. Hence, cinema-side implementations with high bandwidth connections, for example render management units 852A, 852B implemented local to cinema seating may offer a feasible solution to the intensive rendering demands of high-quality immersive content, in the near term. As graphics rendering technology improves, these units may be upgraded periodically to more capable processors with lower power requirements, and eventually phased out when mobile, battery powered processors are powerful enough to handle the processing load. In the alternative, or in addition, very high bandwidth communications technology and improved image compression technology may permit rendering to be offloaded to cloud-implemented rendering units.

The examples discussed in connection with FIG. 7 concern variations of mixed media entertainment including one or both of AR or VR, and 2D screen presentations. Various different "grammars" have been implied by foregoing descriptions of these variations. In the context of AR, VR, or mixed media AR or VR plus 2D entertainment, "grammar" may refer to a set of rules governing interaction between a viewer experiencing a POV into a VR or AR scene, and the scene. These rules might vary from scene to scene (or not), and such variation may itself be a dramatic element. Different grammars may be used for different entertainment objectives and mediums. For example, a fully interactive video-game like experience uses a different grammar than less interactive content aimed primarily at presenting a dramatic story. One aspect of grammar for mixed-media content concerns the relationship between the viewer and the 2D screen. A cinema-sized screen 704 is shown in FIG. 7, but viewers may also desire to consume mixed media 2D and AR or VR content using smaller screens, for example using a home television, notepad computer, or smartphone. Screen sizes may vary from less than 6 inches on the diagonal to tens or even hundreds of feet.

One of the rules for a mixed media grammar may be to maintain a specific geometric relationship between 2D screen size for 2D or stereographic 3D content and related objects experienced only in VR or AR. For example, when watching a movie on a 100-foot-high screen, suppose an AR or VR object represents a 20-foot-long dragon. When this dragon appears on screen, relative to actors perceived to be about six feet tall, it is about three times longer. For example, if an image of a six-foot actor standing up extends vertically about 33 feet up a 100-foot screen, to maintain the same scale the dragon (if extended vertically) needs to fill a bit more than the entire 100 feet of vertical screen space if entirely within the frame. If the dragon is generated in front of the 2D screen using AR or VR equipment, it should still be generated so as to appear about 100 feet long to maintain the same relative scale to the 33-foot-tall actor on the screen. However, perceptual dissonance may be experienced if real objects in the theater (e.g., other audience members) can be seen and compared to the off-screen object.

For example, an off-screen AR 100-foot-long dragon will appear about 17 times larger than a typical adult audience member but only three times larger than the 33-foot actor on the screen. If this size mismatch is noticeable, it may distract the viewer and detract from the dramatic experience. Other size mismatches may occur between cuts or during camera movements such as zooms or pans that affect the size of onscreen reference objects. If a related off-screen object remains visible and unchanged in size across the different cuts or camera changes, it may be perceived as growing or shrinking relative to onscreen objects. On the other hand, if the off-screen object grows or shrinks to match the scale of the on-screen objects, it may be perceived as growing or shrinking relative to the audience, and therefore seem less real, and its changing size may distract from the action on the screen instead of enhancing it.

For further example, consider a mixed AR or VR plus 2D scene in which an actor throws a spherical ball into the audience, such that the ball transforms from an onscreen object to an off-screen object near the beginning of its flight. Meanwhile, an onscreen dog runs into the audience, retrieves the ball, and returns it to the onscreen actor. Suppose the onscreen dog is projected at ten feet high at the place where it leaves the 2D frame, but scaled to the actor onscreen the dog is perceptually only about 2.5 feet high. Likewise, where the ball leaves the frame it is 15 inches wide on screen but to fit in the dog's mouth it can only be about three inches in diameter. If the dog or ball is shown off-screen immediately after it leaves the 2D frame (or in the case of 3D stereoscopic content, passes the stereographic limit), it must be shown at the same size as the onscreen object, or else it will appear to suddenly change in size. However, if the off-screen object is allowed to approach the viewer (whether as a subjective or objective object), and assuming that it is not desired to create an illusion that the onscreen actors are giants compared to the audience members, the off-screen object should be reduced in size as it approaches the viewer. The off-screen object will in such case appear to shrink, which may be distracting and destructive to the illusion of reality afforded by the experience. A grammar for managing transitions for objects as they move between onscreen 2D space and off-screen AR or VR space may therefore be useful.

Transition grammars may be classed in two general types: objective and subjective. In an objective transition grammar, the off-screen objects are "attached" to the 2D screen, as a sort of fixed extension of the screen. Whatever happens on the 2D screen governs the off-screen content, and relative geometry is maintained always with respect to onscreen objects. As such, each member of the audience will see a different view of the off-screen content depending on their point of view. For example, using the example of a dog fetching a ball, the dog is matched to its onscreen size, even if this makes the dog appear much larger or smaller relative to audience members, compared to its size relative to onscreen actors. In a cinema, the audience may see a very large dog suspended above the audience running to fetch the ball from some objective location of the cinema, for example, thirty feet from the center of the screen. If the same content is experienced on a smart phone, a very small AR or VR off-screen dog may be generated that fetches a tiny ball only a few inches away from the smartphone screen.

Thus, in an objective transition grammar, the off-screen space may be generated as a fixed extension of the onscreen space that in a sense excludes the audience, or at least ignores the relative scale of the audience members. The size, position and location of each off-screen object is geometrically tied to the 2D view. Geometrical rules govern the size, position, and location attributes relative to the 2D screen, based on the size of the screen and the AR or VR viewer's position relative to the screen. Passive off-screen objects grow and are pushed behind the audience, in reaction to the 2D camera zooming in. The off-screen objects shrink and are pushed towards the screen in reaction to the 2D camera zooming out. When the camera pans right, the VR/AR processor reacts by pivoting the off-screen objects around the camera viewpoint to the left. When the camera pans up, the off-screen objects are pivoted downwards, and so forth. If the 2D scene cuts suddenly between opposite views (e.g., looking forward and then looking back), the off-screen objects appear and disappear from in front of the screen as appropriate; in the case of a small screen the off-screen objects may reappear behind the screen. When the 2D camera moves through a scene, passive off-screen objects are left behind while active moving off-screen objects may be made to appear to be following the camera movement by staying in roughly the same off-screen location, and so forth. Because the geometry of the off-screen objects depends only on-screen geometry and viewing location relative to the screen plus any active movement of off-screen objects that it is desired to portray, the audience perceives that its relative size is not important to the action, and the illusion of reality is preserved. One of the supplemental rules of this objective transition grammar may be to generally avoid camera movements or cuts at times that would require off-screen objects to change in size or move about too drastically, to avoid saturating the audience with too many distracting movements or changes in off-screen objects.

In a subjective transition grammar, an object leaves the 2D screen space and becomes perceptually a part of the audience. The geometric parameters of the off-screen object are determined relative to a presumed or known subjective viewer who is wearing the AR or VR equipment, and not on the geometry of images in the screen space. In the case of VR, the subjective off-screen objects may displace the 2D screen content and become the entirety of the VR user's experience, which is wholly immersive. Different grammars apply to wholly immersive VR content. The present disclosure is concerned with grammars and methods for use with mixed media 2D plus AR or VR content. With these types of mixed media, there is always 2D screen content to consider, which may include one or both of monoscopic 2D video and stereographic 3D video. While the subjective off-screen content is perceived as being entirely independent of the onscreen action in a geometric sense, the entertainment value of the mixed media content may be enhanced as desired by permitting objects to pass back and forth between onscreen and off-screen space. When a subjective transition grammar is used, it may be desirable to manage transitions of objects between onscreen and off-screen space, so that geometry mismatches do not occur, or are less noticeable.

There are at least two methods for minimizing geometry mismatching in a subjective transition grammar. A first method is "opportunistic" size matching, in which the off-screen object appears at the exact moment when the on-screen object disappears while being of the proper size for subjective use. This moment will naturally differ based on screen size, and will therefore only occur at an appropriate time if the 2D content is edited carefully to support the opportunistic matching for a screen of specific size, or within a limited range of sizes. The matching may be difficult or impossible to achieve convincingly when it is desired to cause relatively large subjective objects to appear to come out of small screens, or relatively small subjective objects to appear to come out of very large screens. Therefore, opportunistic size matching requires editing of 2D and AR or VR content for specific screen sizes, and may be less useful on very small (e.g. smartphone) or very large (e.g., commercial cinema) screens.

A second method for minimizing geometry mismatching in a subjective transition grammar is to use hidden transitions. In a hidden transition, the transition between onscreen and off-screen object is well hidden, or does not occur at all (e.g., the object only appears off-screen). Going back to the example of the dog fetching a ball, the onscreen actor throws the ball so it disappears from the side or back of the scene. A second or two later, a life-size ball appears off-screen from any direction other than the screen, with a life-size dog following, as if both had passed through a door, portal or wormhole. After gamboling about subjectively in relation to the viewer, the dog carrying the ball may pass through the virtual door, portal or wormhole and appear back onscreen at its regular onscreen size. Because the door, portal, wormhole, or other hidden transition device prevents a direct comparison between off-screen and onscreen size, the illusion of reality is preserved. At the same time, a sense of separation between the screen and the audience is preserved because subjective objects do not generally pass directly through the screen, and instead use the hidden transitions. The no-pass-through rule can be broken for subjective objects without causing perceptual dissonance, using opportunistic size matching.

None of the foregoing transition grammars or methods are mutually exclusive. The same mixed media content may make use of all of them, or any number of them, if desired. Different ones of these techniques may be used at the same time for different objects, or at different times for the same object.

In any grammar that enforces a consistent perceived geometry across a screen interface, for example objective transition grammar or subjective transition grammar with opportunistic geometry matching, techniques and algorithms for real-time computational geometry matching as objects pass through a screen would be desirable. These computations may be performed in real-time by the AR or VR output device. Once the position of the output device to the screen, and the screen size are defined, the geometric relationships, algorithms and methods described below can be used to define transformations (e.g., matrices) for scaling, rotating, and translating off-screen objects to positions needed to implement an objective transition grammar or opportunistic matching in a subjective transition grammar. In the alternative, or in addition, mixed media content may be prepared in advance for a particular location or zone relative to a screen of known size (or to screens of known sizes) and the corresponding prepared set of AR or VR data provided to the immersive output device based on a measured or assumed position relative to the screen.

Various use cases are discussed herein below, including geometrical adjustments for matching position, orientation or movement of objects appearing in a VR or AR display with objects depicted by projection or the like of 2D or 3D video content on a display screen. A first case 'A' concerns a VR Head Mounted Display (headset) playback of a 2D or 3D movie with additional virtual objects augmenting the virtual environment synchronized to the playback of 2D or 3D video content. The 2D monoscopic or 3D stereoscopic video may be playing back on a 2D surface within a theater environment (for example a flat screen) or a 3D surface (for example a curved screen) that also appears in a virtual reality or augmented reality environment. The virtual objects are located at various positions relative to the virtual screen playback surface, for example in front of the virtual screen surface towards the viewer, or on the sides or above or below the virtual screen surface. The virtual objects may also be added behind the virtual screen surface. The virtual objects may appear to originate within the 2D video and then leave the 2D screen surface and enter the virtual environment. The virtual objects may appear to originate within the stereoscopic 3D video and then leave the 3D content and enter the virtual environment.

For example, a scene may include VR objects in motion (e.g., arrows being shot) towards a camera that captures the 2D or 3D video content for the scene (hereinafter, the "scene camera"). The intended effect may vary. For example, the director may intend that each viewer see the VR objects appear to fly out of the virtual screen into a virtual environment in front of the screen, and continue towards the viewer until appearing to pass over or around the viewer. In an alternative example, the VR objects are shot away from the camera, with the director intending that the objects remain visible as they leave the 2D screen border and either fly off in some direction away from the viewer. Conversely, a director may intend that the VR objects first appear in an off-screen region and then move into an on-screen region, gradually becoming part of the 2D/3D video while in the process of moving. For example, supposing a scene is shot using a fixed camera showing a road and the sound of the car is edited into the video content while remaining off-screen, a virtual object of a car may be animated such that it appears in VR to drive towards the screen and disappears from the VR rendering as it moves on-screen in the video content.

In other embodiments, the objects displayed in VR can be entirely excluded from ever being included in the 2D or 3D video on-screen content. Instead, the VR objects may supplement on-screen video content. For example, if the on-screen video content shows an actor saying obscure dialog that is not likely to make sense to the viewer, then then VR objects shaped like question marks may be output, appearing off to a side away from an actual or virtual video screen surface, as sort of an annotation.

In other embodiments, a virtual environment in which the viewer is watching virtual on-screen video content is changed in sync with the on-screen content in a way that supplements the on-screen video content. Thus, the virtual screen is made to appear in a virtual environment modeled after the content, such as an immersive virtual environment that is related to the scene being shown in the movie or television episode. For example, if the viewer is watching a Batman movie or television episode on a virtual VR screen, when the on-screen content shows the Batman character in the Bat Cave, the off-screen virtual environment may change to resemble the Bat Cave. When the scene in the movie changes from the Bat Cave to a location in Gotham City, the off-screen virtual environment may change to a surrounding neighborhood of Gotham City. In various embodiments, the on-screen content may blend smoothly with the surrounding environment, or may appear as though projected on a surface in the environment, for example, on a building wall.

Figure 9A:
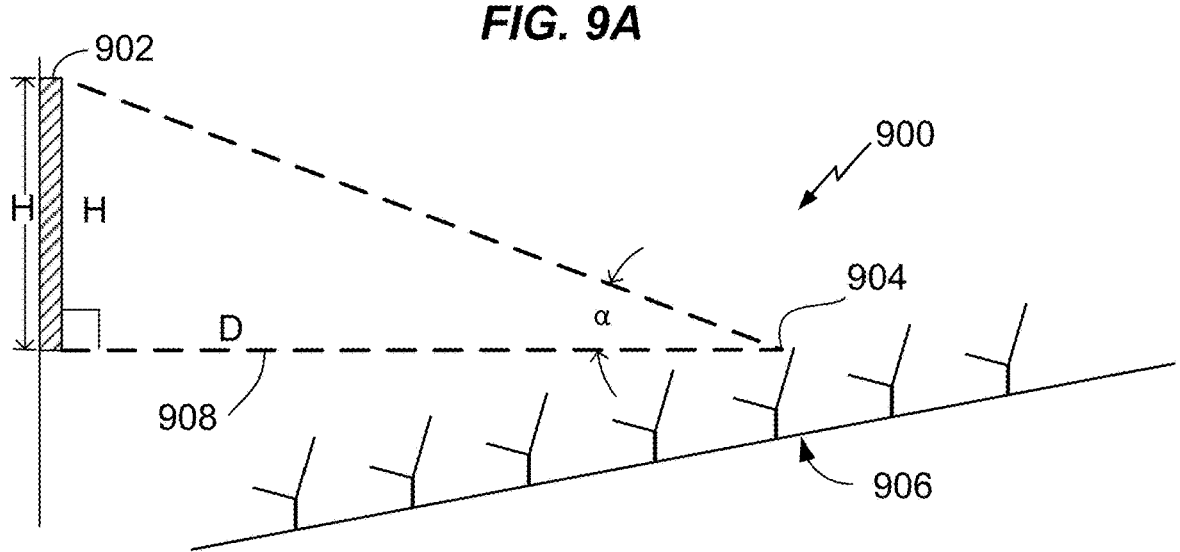

The viewer's perception of the size of objects shown in 20 or 30 video content on a virtual screen surface is a somewhat complicated topic related to many factors. One factor is the relationship between the field of view of the image of the object shown on the screen, and the screen size and the distance between the viewer and the screen. Referring to FIG. 9A, a virtual or real theater 900 includes an array of seats 906, and a screen 902. A vertical field of view ($\alpha$) of the flat virtual screen 902 when level with the depicted viewpoint and perpendicular to a ray from the bottom to the screen 902 to the viewpoint can be calculated by Equation 1, wherein the screen height is H and the distance of the viewer to the screen is D:

$$\tan(\alpha) = (H/D)$$

$$\alpha = \arctan(H/D). \quad \text{(Eq. 1)}$$

The triangle in FIG. 9A is drawn such that the viewing distance D is approximately three screen heights, i.e. D=3H, so a is approximately equal to 18.4 degrees. For an actual screen, in many theaters the bottom of the screen 902 is below the viewer, as diagrammed in FIG. 9B. In that case, assuming the shortest distance D between the screen 902 and the viewpoint 904 forms a ray 910 perpendicular to the screen, then a is given by Equation 2:

$$\alpha = \alpha_1 + \alpha_2 = \arctan(H_1/D) + \arctan(H_2/D); \quad \text{(Eq. 2)}$$

wherein $H=H_1+H_2$. For example, if H=1, D=3 and $H_1=H_2$, Equation 2 reduces to 2 arctan(0.5/3)=18.9 degrees. Meanwhile, the imaginary cylindrical or spherical screen 910 is positioned to have the same vertical field of view as the flat screen 902. If α is expressed in radians, the length (L) of the portion of the screen 910 positioned within the vertical field of view is given by αD. For example, if α=18.9 degrees, H=1 and D=3, then L=0.99. This is approximately equal to H. For some range of H and D, for example such as for D>2H, H≈L=αD. At the arbitrary limit of D=2H, the approximation results in 28.65°, which differs by about 2% in comparison to the result provided by Eq. 2 (28.07°, for $H_1=H_2$ with H=1 and D=2. This error decreases with decreasing H/D and increases as $H_1$ becomes much larger or smaller than $H_2$. For example, when $H_1=2H_2$, the error is about 2.7%. It may be useful when great precision is not required, therefore, for most practically encountered values of $H_1/H_2$ between about 0.5 and 2, and for D>2H, with a expressed in radians, to make use of the following approximation to speed up computation:

$$\alpha \approx H/D \quad \text{(Eq. 3)}$$

Figure 9B:
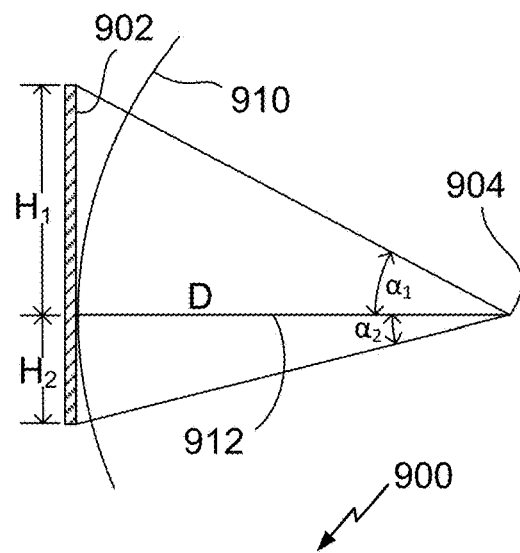
Figure 9C:
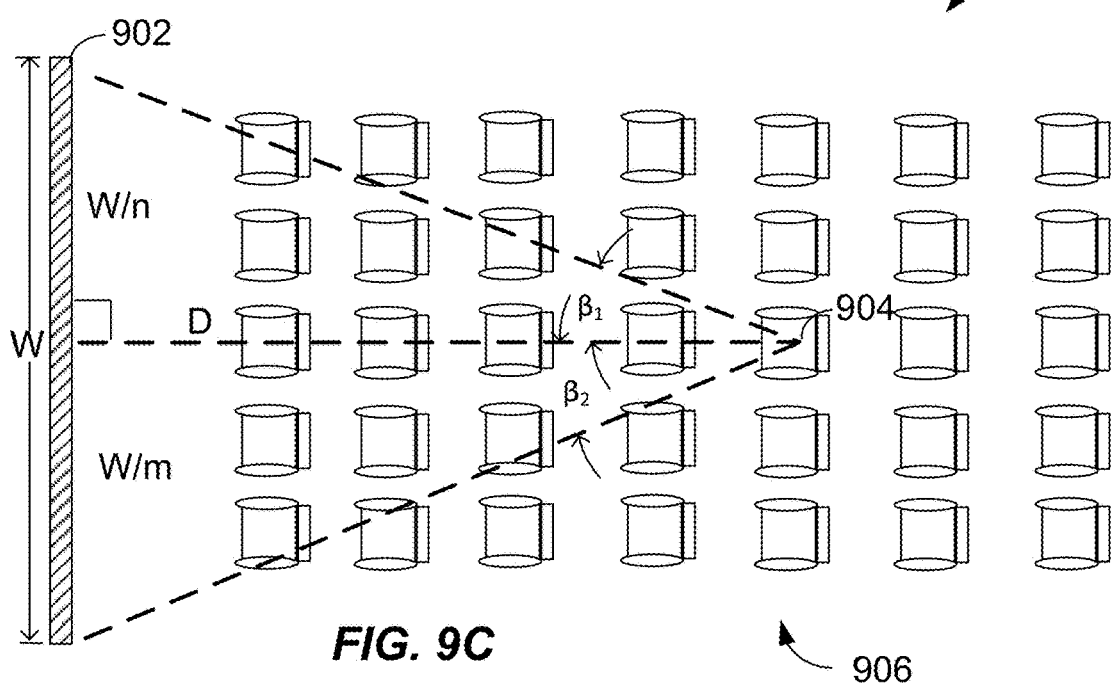

Referring to FIG. 9C, in the same real or virtual theater 900, the horizontal field of view of the screen (β) can be calculated by the following equation for a viewpoint 904 centered on the screen, wherein the screen width is W and the distance of the viewer to the screen is D:

$$\tan(\beta/2) = (W/2)/D$$

$$\beta/2 = \arctan((W/2)/D)$$

$$\beta = 2*\arctan((W/2)/D) \quad \text{(Eq. 4)}$$

The triangle in the above figure is drawn such that the viewing distance is approximately 1.5 screen widths (W), i.e. D=W. By logic similar to that applied to FIG. 9B, when the viewpoint 904 is not aligned with the center of the screen, $$\beta = \beta_1 + \beta_2 = \arctan(W_1/D) + \arctan(W_2/D); \quad \text{(Eq. 5)}$$

wherein $W=W_1+W_2$. The approximation of $$\beta \approx W/D \quad \text{(Eq. 6)}$$

likewise applies with an error of about 2% or less so long as D>2W (for β expressed in radians). The approximation for β will be less accurate than the approximation for α, for screens in widescreen formats. However, the approximations will still be valid for objects displayed on-screen that are substantially smaller than screen size, because the ratio of object size to view distance will likewise be substantially smaller than for the entire screen. Both approximations may therefore remain useful when estimating vertical or horizontal fields of field for on-screen objects, simply by replacing object width or height for screen width or height, respectively.

By way of example, a virtual screen in a virtual environment is configured to show movies and video content commonly using one of the following aspect ratios: 16:9, 2.40:1 or 1.85:1. Content created for other less common screen types can use different native original aspect ratios, for example content prepared for IMAX digital projection screens often use 1.90:1, IMAX 70 mm/15 perf film projection screens often use 1.43:1, and 70 mm/5 perf film projection often use 2.20:1. An immersive virtual reality headset can accommodate any desired screen aspect ratio. However, industry-standard aspect ratios may often be used to take advantage of available content libraries.

In many cases it will be desirable for VR or AR objects appearing in the virtual environment to have a particular geometric relationship (e.g., bigger, smaller, or same size in one or more dimensions) to the objects shown within the 2D or 3D onscreen content. For example, it may be desirable to match a viewer-perceived size of a virtual object in the virtual environment with a viewer-perceived size of an object appearing in on-screen content at the same time. In other cases, for further example, it may be desirable to create a noticeable perceptual size difference between the on-screen objects and the virtual objects that may appear in the virtual environment. In either case, a system providing VR or AR content may be configured to control VR/AR output such that the viewer's perception of size of objects appearing in VR or AR meets a specified criterion (e.g., bigger, smaller, or same size in one or more dimensions) relative to one or more objects appearing in related on-screen content. Further examples are provided herein above.

As demonstrated in connection with FIGS. 9A-C, the angular field of view of a screen or of an object displayed on a screen as it appears from any given point of view is determined by a geometric relationship between the viewer's viewing distance from the screen and the screen's dimensions or screen object's dimensions. A viewer of one screen or screen object of a given size at a certain viewing distance can perceive the same angular field of view as when viewing a different screen or screen object of a different size at a different viewing distance. However, in a real environment the screen or object size as perceived by the viewer may also depend on environmental cues in addition to angular field of view.

Figure 10:
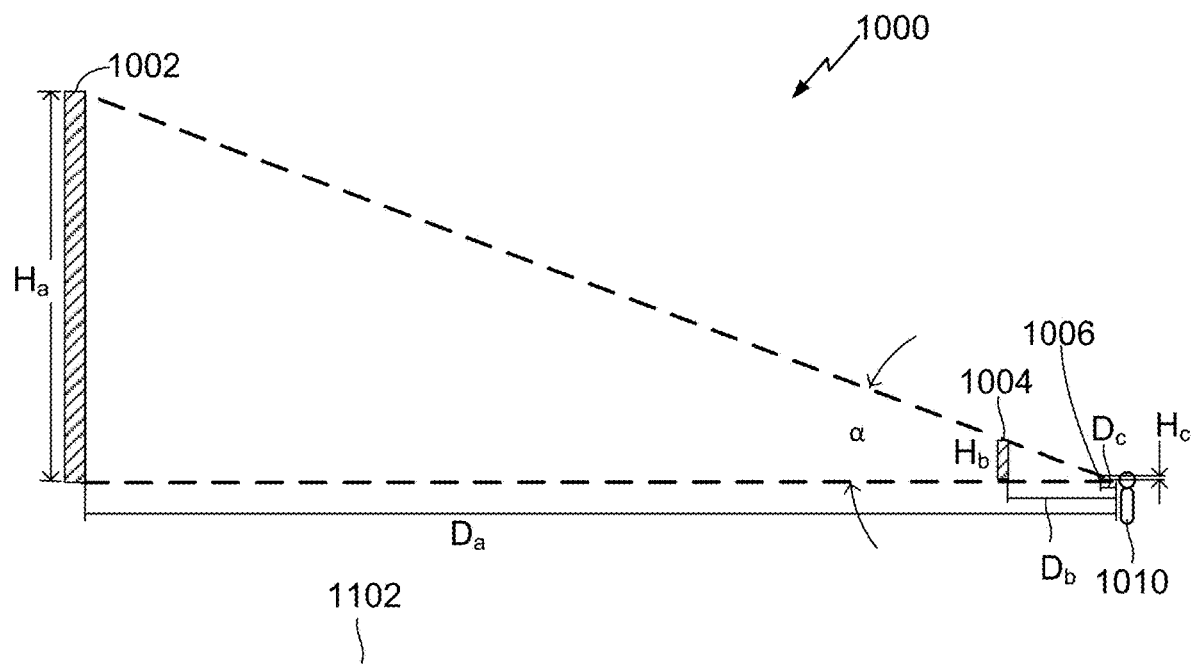
FIG. 10 is a diagram is a diagram illustrating aspects of varying screen distance for a screen while holding its angular size constant.

For example, consider three different views 1000 of three different screens at different distances, all having the same angular vertical field of view 'α' as shown in FIG. 10. A viewer 1010 is viewing a theatrical screen 1002 a distance $D_a$ of 60 feet away that has a screen height $H_a$ of 20 feet; the resulting vertical field of view for the viewer 1010 is α=arctan(20 feet/60 feet)=18.4°. By the same trigonometric relationships, all other things being equal, a home television screen 1004 having a height $H_b$ of 2 feet and a distance Db of 6 feet away also has α=18.4°. Likewise, a tablet screen 1006 having a height $H_c$ of 6 inches and being a distance $D_c$ of 18 inches away from the viewer 1010 will have an a identical to that of the larger, more distant screens 1004, 1002.

The same object (for example, a moose) will be perceived as having a different size by the viewer 1010 depending on which screen it appears. For example, a moose substantially filling the cinema screen 1002 would be perceived as about $H_a$ (e.g. 20) feet high, about 2 feet high on the home television screen 1004, and about 6 inches high on the tablet screen. These different perceptions would result from other visual cues available to user in a real environment concerning the actual screen size and its distance away. These cues can be managed for virtual screens in VR environments. Nonetheless, in VR content that includes a virtual screen display, the viewer will perceive a definite screen size and distance to the screen, based on whatever cues are observed in the virtual environment. In an AR environment, the screen size and distance cues will be perceived by the viewer by observation of the actual viewing environment. Either way, it would be convenient to have a reliable metric by which to measure pertinent cues to screen size and distance.

The foregoing examples demonstrate that an angular field of view alone is not the sole determinant for the perceptual size of onscreen objects, but it clearly remains one of the determinants. In addition to angular field of view, the distance to the object may be used as a simple geometric metric for quantifying the perceptual size of the object as experienced by a viewer.

Figure 11:
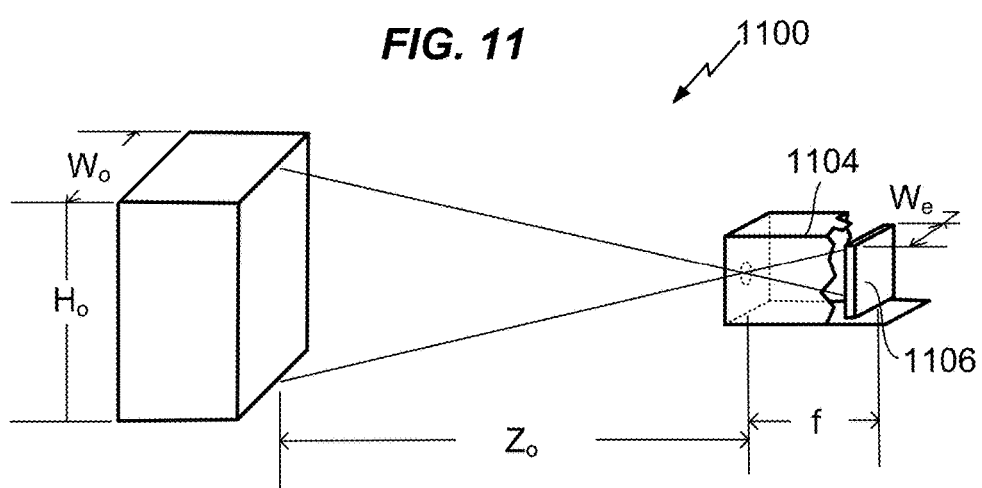
FIG. 11 is a diagram illustrating aspects of imaging a scene using a camera.

In an AR or real environment including onscreen display of 2D content, all onscreen objects appear on the screen. Thus, distance to any onscreen object equals the real and perceived viewing distance between the viewer and the screen. In other words, the perceived distance ($Z_i$) from the viewer to the image of the object is equal to the perceived viewing distance (V), so $Z_i=V$. Referring to FIG. 11, for objects appearing in 2D onscreen content, the object's perceptual size (e.g., width×height) on screen is determined by the geometric relationship between the object 1102 and camera 1104 on set 1100, and the screen size. For example, the object's onscreen horizontal width ($W_{i2D}$) is determined by the equation:

$$W_{i2D}=(M_w W_o f)/Z_o \quad \text{(Eq. 7)}$$

where the camera lens focal length is f, the distance to the object from the camera is $Z_o$, the object's physical width perpendicular to the camera on set is $W_o$, the camera sensor width is $W_e$ and the screen width is $W_s$, and the magnification factor $M_w$ is defined as $W_s/W_e$. Likewise, the object's vertical height ($H_{i2d}$) is determined by $$H_{i2d}=(M_h H_o f)/Z_o \quad \text{(Eq. 8)}$$

wherein the object's physical height perpendicular to the camera on set is $H_o$ and $M_h=H_s/H_e$.

For 3D movies, the viewer sees the 3D onscreen object located at some distance in front of or behind the physical screen. The viewer's perceived distance to a 3D onscreen object depends on various factors, including the distance between the viewer and screen, the way the 3D movie content was produced and the object's distance from the camera on set. If the 3D content was produced with "native 3D" stereoscopic cameras, then the camera settings like camera lens focal length, camera sensor size, screen size, stereo camera separation, and stereo camera horizontal disparity shift affect the position of the convergence point. The convergence point is the point at which the optical axes of the stereoscopic cameras converge on the set. The distance of the objects on set relative to the convergence point affects the perceived distance to the 3D image of the object when it is shown to the viewer on the 3D screen. Objects that are closer to the camera than the convergence point will appear to be in front of the screen and objects that are farther from the camera beyond the convergence point will appear behind the screen. Objects that are the same distance as the convergence point will appear at the screen distance.

For 3D content that is produced with "native 3D" stereoscopic cameras, the perceived distance $Z_i$ from the viewer to the 3D image of the object is equal to $$Z_i=(VeZ_o)/(M_w ft-Z_o(2M_w h-e)) \quad \text{(Eq. 9)}$$

wherein V is the viewing distance between the viewer and the screen, e is the eye separation, t is the stereo camera separation, and h is the horizontal camera sensor shift distance. The horizontal location of the object relative to the viewer is equal to $$X_i=(M_w ef X_o)/(M_w ft-Z_o(2M_w h-e)) \quad \text{(Eq. 10)}$$

wherein Xo is the perpendicular horizontal distance between the object from the optical axis of the camera on set.

The vertical location $Y_i$ of the object relative to the viewer is equal to $$Y_i=(M_h ef Y_o)/(M_h ft-Z_o(2M_h h-e)) \quad \text{(Eq. 11)}$$

wherein $Y_o$ is the perpendicular horizontal distance between the object from the optical axis of the camera on set. The perceptual size (width) $W_{i3D}$ of the 3D image of the onscreen object is equal to $$W_{i3D}=(M_w ef W_o)/(M_w ft-Z_o(2M_w h-e)) \quad \text{(Eq. 12)}$$

The perceptual size (height) $H_{i3D}$ of the 3D image of the object is equal to $$H_{i3D}=(M_h ef H_o)/(M_h ft-Z_o(2M_h h-e)) \quad \text{(Eq. 13)}$$

The perceptual size (depth) $D_{i3D}$ of the 3D image of the object is equal to $$D_{i3D}=Z_{ib}-Z_{ia}, \text{ wherein } Z_{ib}=(VeZ_{ob})/(M_w ft-Z_{ob}(2M_w h-e)) \text{ and}$$

$$Z_{ia}=(VeZ_{oa})/(M_w ft-Z_{oa}(2M_w h-e)); \text{ thus}$$

$$D_{i3D}=(VeZ_{ob})/(M_w ft-Z_{ob}(2M_w h-e))$$

$$-(VeZ_{oa})/(M_w ft-Z_{oa}(2M_w h-e)) \quad \text{(Eq. 14)}$$

In an alternative form $D_{i3D}$, is equal to $$D_{i3D}=D_o * M_d \quad \text{(Eq. 15)}$$

wherein the object's physical depth in the direction parallel to the camera on set is $D_o=(Z_{ob}-Z_{oa})$ and $M_d$ is the 3D Depth Magnification factor defined by $$M_d=(M_w Veft)/(M_w ft-Z_o(2M_w h-e))^2 \quad \text{(Eq. 16)}$$

If the 3D content was produced as "converted 3D", then a stereo 3D camera is not used for the production of the stereoscopic image pairs that make up the 3D movie. Instead the final 2D images are converted from 2D to 3D by adjusting the stereo disparity of the objects in the scene, with the disparity in pixels units determining the distance to the image of the object perceived by the viewer. The distance to the image of the object, Zi, in terms of pixel disparity ($d_p$) is equal to $$Z_i=(Ve)/(e-P), \text{ wherein}$$

$$P=d_p W_s/X_{res}. \text{ Substituting for } P, \text{ we obtain}$$

$$Z_i=(Ve)/(e-(d_p W_s/X_{res})). \text{ Multiplying by } X_{res}/X_{res}, \text{ we obtain}$$

$$Z_i=(VeX_{res})/(X_{res}e-d_p W_s) \quad \text{(Eq. 17)}$$

wherein $d_p$ is the pixel disparity (in units of pixels) between homologous points of an object in the left and right eye images, $W_s$ is the screen width (for example 20 feet), and $X_{res}$ is the width of the image in pixels (for example 1920 for a 1920×1080 resolution image). If $d_p$ is zero, the distance to the image of the object will be equal to the viewing distance and the object will appear to be at the screen plane. If $d_p$ is negative, the distance to the image of the object will be less than the viewing distance and the object will appear to be in front of the screen towards the viewer. If $d_p$ is positive, the distance to the image of the object will be greater than the viewing distance and the object will appear to be behind the screen away from the viewer.

For converted 3D, the perceptual size (width) of the 3D image of the object is equal to $$W_{i3D} = W_{i2D} Z_t / V = W_{i2d}(e/(e-P)). \quad \text{(Eq. 18)}$$

As before, $P = d_p W_s / X_{res}$ and $W_{i2D} = (M_w W_o f) / Z_o$. Substituting in Equation 18, we obtain:

$$W_{i3D} = ((M_w W_o f)/Z_o) * (e/(e-(d_p W_s / X_{res}))) = (M_w W_o f - e X_{res}) / (Z_o (X_{res} e - d_p W_s)) \quad \text{(Eq. 19)}$$

Likewise, the perceived height ($H_{i3D}$) of the 3D image of the object is provided by:

$$H_{i3D} = (M H_o f e X_{res}) / (Z_o (X_{res} e - d_p W_s)) \quad \text{(Eq. 20)}$$

When an object transitions from existing as an image of an object represented in the 2D or 3D movie content, to a virtual object augmenting the 2D or 3D movie content in a virtual environment, the viewer's perception of the size of the object, represented by $W_{i2D}$ and $H_{i2D}$ for 2D content, and $W_{i3D}$, $H_{i3D}$ and $O_{i3D}$ for 3D content, and the location ($X_i$, $Y_i$, $Z_i$) of the object should match in both domains as the object transitions from one domain (within the 2D or 3D movie content) to the other domain (as a virtual object in a virtual environment). If the object is going to emerge from the 2D movie content into the theater space in front of the virtual screen, then matching of location and size can be accomplished by adjusting the rendering of the virtual object so it exists at the screen surface ($Z_i = O$) as it transitions, with object width equal to $W_{i2D}$ and object height equal to $H_{i2D}$. If the object is going to emerge from the 3D movie content into the theater space in front of the virtual screen, then matching of location and size can be accomplished by adjusting the rendering of the virtual object so its location is equal to the location of the corresponding location ($X_i$, $Y_i$, $Z_i$) of the image of the object within the 3D movie content, and the virtual object's size (width, height, depth) is equal to $W_{i3D}$, $H_{i3D}$ and $O_{i3D}$ respectively.

A server or VR device that is providing VR data will generally possess information where each viewer is in the virtual environment relative to the virtual screen, because it is rendering both the screen and the virtual environment according to a viewer's position and pose within the virtual environment. The initial position of the viewer in the virtual environment relative to the screen is determined by VR playback software program. The initial position of the viewer may be a user configurable setting, that could be changed before the playback begins or during the playback. If the VR headset has a position tracking feature, like the Oculus OK2 and HTC Vive, the position of the viewer in the virtual environment relative to the screen should be adjusted to compensate for any detected position movement by the viewer of the VR headset.

In other use cases, an AR headset or like may provide playback of a 2D or 3D movie with additional virtual objects augmenting the virtual environment synchronized to the playback of a 2D or 3D movie. AR use cases may be similar the VR use case described above, except using Augmented Reality glasses head mounted display instead of VR headset, and using a real cinema or television screen is used instead of a virtual screen in a virtual environment. Because the AR headset is not rendering a virtual screen in a virtual environment, it should obtain or possess information about the relative position an orientation of the AR headset and the real screen. For example, the AR headset may detect and compensate for the location of the real cinema screen relative to the viewer.

The location of the viewer's position relative to the real cinema screen may be determined, for example, using a camera mounted on the AR headset that views a unique QR code image and detects the unique identifier associated with the QR code image. The QR code image is located on the back of each seat in the movie theater. A separate calibration process may be performed before the theater is used for AR headset playback to associate each unique QR code on the back of every seat with a viewing position in the theater where the distance from the screen is $Z_v = V$ and the horizontal distance from the center of the screen is $X_v$ and the vertical distance from the center of the screen is $Y_v$.

In alternative embodiments, fiducial markers may be mounted on the theater walls, for example, markers comprising image-based patterns of known geometry or IR-based emitters. Each AR headset may sense these fiducial markers by a camera or detector mounted to the AR headset to determine where the AR headset is located relative to the fiducial markers. The fiducial markers may also be used to indicate the screen boundaries. An AR headset or other data source may determine the viewer's position ($X_v, Y_v, Z_v$) in the theater, and apply an appropriate compensation as an object transitions from the image content domain (in 2D or 3D movie) to the virtual object domain (in real cinema theater space), or for matching the perceived sizes of AR objects to onscreen objects.

In other use cases, a VR headset may playback a 2D or 3D movie while showing additional virtual objects augmenting the virtual environment synchronized to the playback of a 2D or 3D movie, simulating an AR use case as described above. The AR experience that is simulated may be of a type that is originally prepared for a viewer wearing AR headset watching a 2D or 3D movie in a real cinema environment while the AR object output by the AR headset augments the viewing experience in the real cinema environment. For example, to simulate an AR experience in a real cinema environment produced for a "theatrical release", a purely VR headset may be used to reproduce a similar experience at home, for a "home entertainment release." The VR content may be re-edited so it augments a virtual screen in a virtual environment when used with a VR headset.

In other use cases, a VR headset may playback onscreen 2D or 3D content while providing additional audio commentary synchronized to onscreen content. Using a VR headset, combining playback of a 2D or 3D movie video and audio presentation that appears to the viewer wearing the VR headset to be located on a surface (like a screen) within a virtual environment (like a theater) with additional playback of additional pre-recorded audio tracks (like commentary tracks) that are synchronized to the video playback and assigning the playback of additional prerecorded audio tracks a location associated with a virtual object within the virtual reality environment at locations near or around the viewer. The use of the spatial audio capabilities of the VR headset playback system allows the viewer to believe he is watching the movie with the people making the audio commentary sitting around him. The virtual object maybe a virtual human sitting in a seat near the viewer's location in the virtual environment. The synchronized audio commentary recording may be repurposed from existing recordings that were released as part of special features of DVD or Blu-ray disc releases for the corresponding 2D or 3D content. The virtual human objects may be animated either in sync to the movie playback and audio commentary or not in sync. If the virtual human objects are moving in a way that is not in sync with the movie playback, it could help make them look like humans sitting in chair which normally have some body motion even though they are sitting in one place. It should also be possible to disable the audio commentary should be and just allow movie audio to be heard. It should also be possible to disable the visibility of the virtual human objects to allow the viewer just enjoy the movie video playback on the virtual screen surface.

In view the foregoing, and by way of additional example, FIGS. 12-15 show aspects of a method 1200 or methods for providing geometric matching in presentations of mixed media content. The method 1200 may be performed by an AR output device including a programmable computer, by a VR output device including a programmable computer, by one or more computers in communication with the AR output device or VR output device, or by a combination of an AR or VR output device and one or more computers in communication with the output device.

Referring to FIG. 12, a computer-implemented method for geometric matching may include, at 1210, receiving digital cinematic master data that includes at least one of AR or VR data for displaying one of an AR output object or a VR output object contemporaneously with video data formatted for display on a 2D screen. In other words, the digital cinematic master data includes mixed media. The video data may be 2D video data, or 3D (stereoscopic) video data. The 2D screen may be a real physical screen (e.g., a surface for projection, or an active display screen such as an LCD display) or a virtual screen generated at a defined virtual position in a VR display. In a presentation of the mixed media, a VR output device may output both the VR data and the video data in a VR display, an AR output device may output the AR data in an AR display in contemporaneous coordination with a separate display device that displays the video data, or both may occur for different users. In the alternative, or in addition, the method 1200 may include providing the mixed media digital cinematic master data to an AR output device or to a VR output device, for example by streaming over a computer network, by wireless transmission over a wireless network, by supplying digital data via kiosks, or some combination of the foregoing.

The method 1200 may include, at 1220, determining a first value set indicating at least one of an angular field of view of the 2D screen or of an object appearing thereon, relative to the at least one of the AR output device or the VR output device. A computation consistent with one or more of Equations 1-8, or other suitable computation, may be used to determine the first value set. As used herein, a "value set" means a set of one or more quantitative values. The first value set characterizes the magnitude of the angular field of view of the onscreen object, for example, using angular values $\alpha$ and $\beta$ as described herein above. "Relative to the at least one of the AR output device or the VR output device" means from a point of view determined based on location of the relevant output device. The first value set is calculated as a mathematical indication or representation of the angular field of view as seen by a hypothetical or actual viewer. The viewer is, or is assumed to be, wearing the AR output device or the VR output device, whichever applies.

The method 1200 may include, at 1230, determining a second value set indicating a shortest current distance between the 2D screen and the at least one of the AR output device or the VR output device. The determining may be based on a physical measurement, assigned based on typical data for the type of screen in use, preassigned to a device associated with a theater seat, of by any other suitable method. For example, an AR output device or VR output device may measure distance to a screen by analyzing calibration marks displayed on the screen, measuring the time required for a signal to travel between the output device and the screen, or by locating the device and the screen using triangulation. The distance measurement may not require a high precision. For example, the measurement may be useful even if made to a precision of plus or minus ten percent, or plus or minus twenty percent. In addition, or in the alternative, the operation 1230 may include determining the second value set indicating a shortest current distance between a stereoscopic screen object $Z_i$ and the at least one of the AR output device or the VR output device, for example using any suitable on of the equations for $Z_i$ disclosed herein above, or a suitable adaptation thereof.

The method 1200 may include, at 1240, calculating a third value set for causing an off-screen angular field of view of the at least one of the AR output object or the VR output object to have a fixed relationship to at least one of the angular field of view of the onscreen object or the angular field of view of the 2D screen. The calculating may be based at least in part on the first value set and on the second value set, or in other words, on quantities determining the screen or screen-object angular field of view and the distance to the screen (or perceptual distance $Z_i$ to a stereographic screen object). The fixed relation may be expressed as a relation of equality to the targeted angular field of view or as a proportion of the targeted angular field of view. The targeted field of view may be one of the angular field of view of the onscreen object or the angular field of view of the 2D screen.

In performing the calculation, for example, a processor of the AR or VR output device or associate computer may set the off-screen angular field of view for the off-screen object substantially equal within a perceptual error band (e.g., plus or minus 10%), or exactly equal, to the angular field of field of view of a corresponding onscreen object in a recent frame of the video data. For example, if it is desired to match the vertical angular field of view to an onscreen object approximated by $\alpha \approx H/D$ (Eq. 1), in which a is constant, $H_v$ may be determined approximately by $H_v \approx \alpha D_v$, wherein $H_v$ is the height of the off-screen object and $D_v$ is its virtual distance from the viewer. The third value set may consist of or include $H_v$ and/or other variable such as $D_v$. $D_v$ is the length of a virtual vector from the viewer to the off-screen object and can be determined geometrically based on scene parameters and on D, which is known. For example, if scene parameters specify that the off-screen object should be generated at some angle $\Phi$ off center of a ray from the viewer to the center of the screen and at some percentage 'p' of the center ray distance D, then $D_v = pD/\text{cosine}(\Phi)$, wherein cosine$(\Phi) = pD/D_v$.

If there is no corresponding onscreen object, or if it is not desired to match the off-screen angular field of view to any corresponding onscreen object, the processor may set the off-screen angular field of view equal to a predetermined percentage of a screen angular field of view. For example, if 'q' is a specified percentage of the 2D screen angular field of view, the processor may determine $H_v$ based on $q\alpha$ instead of $\alpha$ as outlined above. It should be apparent that the more exact trigonometric relations provided herein, or similar relations, may be used instead of the approximations described above for clarity of example. If should also be apparent that a similar algorithms for determining a width (W) of the off-screen object instead of height (H) can easily be derived from Equations 4-6 based on the examples above.

The method 1200 may include, at 1250, outputting data for displaying the at least one of the AR output object or the VR output object having the off-screen angular field of view. The off-screen AR or VR object is positioned in the virtual space based on the scene parameters used for determining the third value set.

Figure 14:
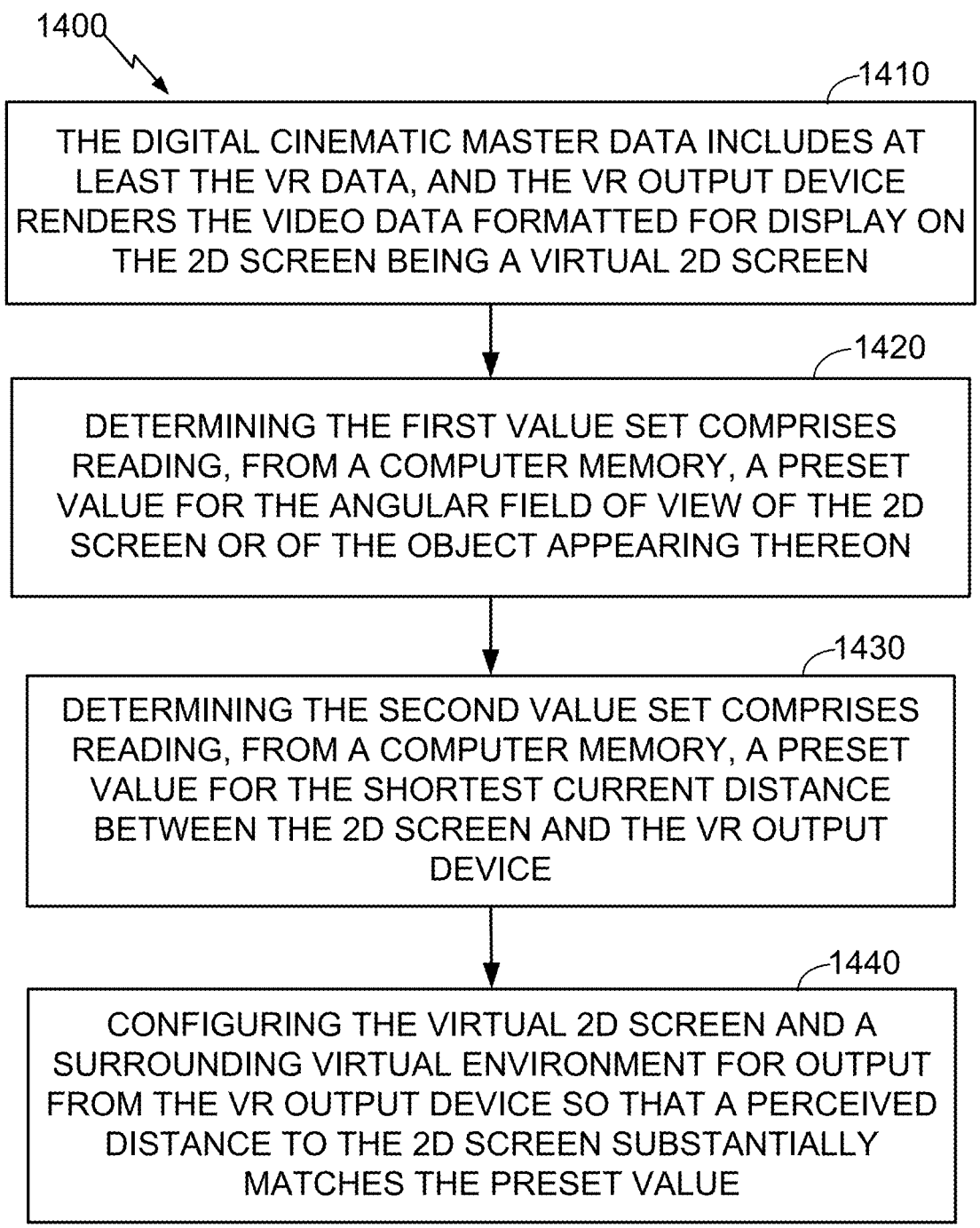
Figure 15:
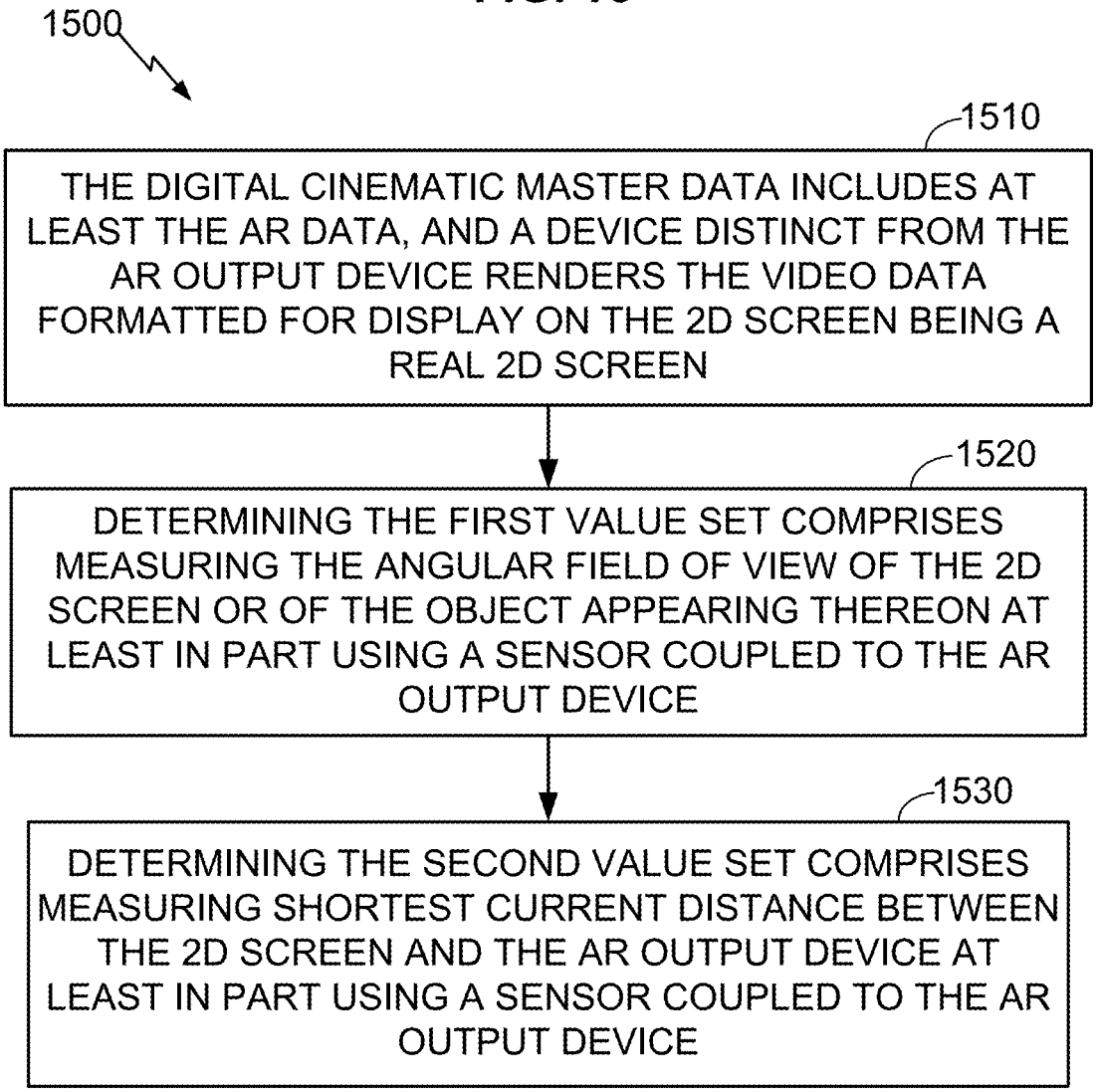

The method 1200 may include any one or more of additional operations 1300, 1400 or 1500, shown in FIGS. 13, 14 and 15, in any operable order. Each of these additional operations is not necessarily performed in every embodiment of the method, and the presence of any one of the operations 1300, 1400 or 1500 does not necessarily require that any other of these additional operations also be performed.

Referring to FIG. 13 showing certain additional operations 1300, the method 1200 may further include, at 1310, determining at least one of an orientation and position of the at least one of the AR output device or the VR output device, relative to the 2D screen. The method may further include calculating the off-screen angular field of view further based on at least one of the orientation and position of the output device. In the alternative, or in addition, the orientation and position of the output device may be used to transform the virtual space to a screen-relative space, to enforce an objective, screen-relative grammar.

In addition, the method 1200 may include, at 1320, determining at least one of an orientation and position of the at least one of the AR output object or the VR output object, relative to the 2D screen. In such case, the method 1200 may include, at 1330, calculating the off-screen angular field of view may be further based on at least one of the orientation and position and on the three-dimensional geometry of the AR object or the 3D object. In other words, as the AR object or VR object rotates around one or more axes, unless it is perfectly symmetrical about the axis of rotation, its angular field of view will vary as it rotates. The amount of variation will be related to its angular field of view when in its reference orientation and the geometrical shape of the object, in addition to its position and orientation.

In addition, the method 1200 may further include, at 1340, calculating the off-screen angular field of view further based on meeting a defined perceptual criterion for a portion of the digital cinematic master data, for example, for a single scene or set of related scenes. In an aspect, the perceptual criterion may include specifying a perceived size of the at least one of the AR output object or the VR output object relative to a related on-screen object according to a relation selected from: substantially greater than, substantially less than, substantially equal to, specific percentage of, or ratio to. An object appearing in AR/VR may be related to an onscreen object either by representing the same prop or character, or by interacting with one another in a synchronized way. In this context, "substantially" means "perceptible to the ordinary audience member." For example, two objects are of substantially equal size if an ordinary audience not specifically looking for size differences would not perceive any difference in size while watching the video and AR/VR content for their intended entertainment purpose.

In an alternative aspect, the perceptual criterion may include specifying a perceived size of the at least one of the AR output object or the VR output object relative to a size of the 2D screen or object appearing thereon according to any selected one of the foregoing relations for monoscopic 2D video or similarly for stereographic 3D video. For example, for stereoscopic 3D object may appear at a perceptual distance from the viewer '$Z_i$' that is not equal to 'D' the distance between the screen and the viewer. The processor may therefore calculate the perceived object size based on the perceived distance $Z_i$ instead of the screen distance. In another aspect, the method 1200 may include, at 1350, varying the perceptual criterion based on transitioning between different portions of the digital cinematic master data. For example, different criteria may be used for different scenes, depending on the intended dramatic effect. The same off-screen object may appear larger or smaller in different scenes, or in different parts of the same scene, for dramatic effect.

Referring to FIG. 14 showing certain additional operations 1400 pertinent to embodiments wherein the digital cinematic master data includes at least the VR data, the method 1200 may further include, at 1410, the VR output device rendering the video data formatted for display on the 2D screen being a virtual 2D screen. In related aspects, the method 1200 may include, at 1420, determining the first value set may include reading, from a computer memory, a preset value for the angular field of view of the 2D screen or of the object appearing thereon. The preset value may be a constant value selected to provide a director determined experience to the VR user. In the alternative, the angular field of view of the screen may be user-controllable or determined based on environmental factors, such as for example the VR user's position in an actual cinema.

In related aspects, the method 1200 may include, at 1430 determining the second value set at least in part by reading, from a computer memory, a preset value for the shortest current distance between the 2D screen and the VR output device. The shortest current distance value may be fixed by a director, user controllable, or based on detected environmental factors as noted above. The method 1200 may include, at 1440, configuring the virtual 2D screen and a surrounding virtual environment for output from the VR output device so that a perceived distance to the 2D screen substantially matches the preset value. The perceived distance may be, for example, a stereographic distance $Z_i$ as described herein above. The surrounding virtual environment should be configured to provide appropriate distance cues, such as, for example, consistent use of perspective, placement of intervening objects (e.g., theater seats and virtual audience members) and contextual clues (e.g., cinema, living room, or hand-held). These cues may easily be provided by modeling and rendering a model of the desired space, or by capturing an actual space of the desired size and context using a VR camera system, during the VR content creation process.

FIG. 15 shows certain additional operations 1500 pertinent to embodiments wherein the digital cinematic master data includes at least the AR data and a device (e.g., a projector, television, laptop computer, notepad computer, or smartphone) distinct from the AR output device renders the video data formatted for display on the 2D screen, being a real 2D screen. The method 1200 may further include, at 1510, determining the first value set at least in part by measuring the angular field of view of the 2D screen or of the object appearing thereon. The measuring may include at 1520 using a sensor coupled to the AR output device to determine the angular field of view, in combination with ancillary equipment such as a processor executing an analysis algorithm. For example, horizontal and vertical registration marks may be displayed on the screen prior to beginning the AR presentation. A camera located on the AR output device may generate an image of the screen. A processor executing an image analysis algorithm may analyze the image using a suitable geometric process as outlined earlier in this disclosure, and determine values for horizontal and vertical angular field of view, or equivalent measure.

In addition, the method 1200 may include, at 1530, determining the second value set at least in part by measuring a shortest current distance between the 2D screen and the AR output device using a sensor coupled to the AR output device. Any suitable method may be used to determine a distance to the AR output device, for example, SONAR or RADAR technique in which distance is determined from transit time of an echo, or of a transmitted signal, using a sensor comprising a transceiver or signal generator (e.g., ultrasonic emitter) coupled to a clock. Where information regarding the screen size is available, the distance can be determined by the AR processor using an image analysis method. For example, registration marks displayed on the screen for measuring the angular field of view may be accompanied by an optical code encoding a geometric description of the registration marks, for example, distances and angles between the marks. An image analysis algorithm operating on the AR device may determine the second value set based on the geometry of the registration marks, using a sensor comprising a digital camera image sensor. For example, using Equations 3 and 6 for simplicity of example, the vertical component 'α' of the field of view may be measured while 'H' is read from the optical code. The distance to the screen 'D' can therefore be approximated by D≈H/α. More exact trigonometric relationships expressed by Equations 1 and 2, or similar relationships, may be used to determine a more exact value for 'D'. Similarly, 'D' may be determined approximately from W/β or from the more exact relationships in Equations 4 and 5. For further example, distance to the screen in a cinema or home theater setting may be determined by association of the AR device with a particular cinema seat or zone having a known position with relative to the screen, using a location sensor.

Figure 16:
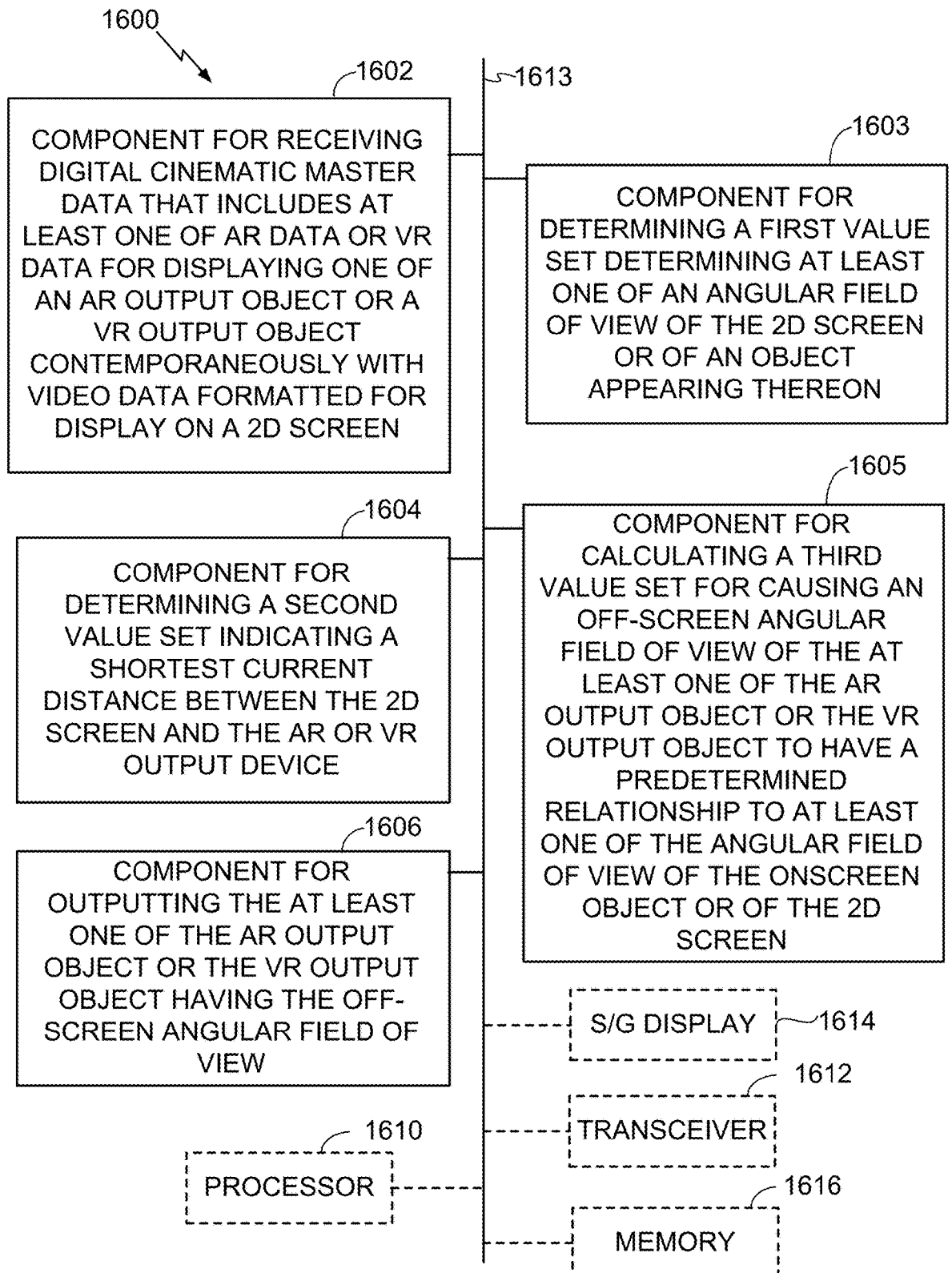
FIG. 16 is a conceptual block diagram illustrating components of an apparatus or system for geometry matching in AR or VR.

FIG. 16 is a conceptual block diagram illustrating components of an apparatus or system 1600 for providing contemporaneous immersive and non-immersive play in a cinema or home theater, as described herein. The apparatus or system 1600 may include additional or more detailed components for performing functions or process operations as described herein. For example, the processor 1610 and memory 1616 may contain an instantiation of a process for geometric matching as described herein above. As depicted, the apparatus or system 1600 may include functional blocks that can represent functions implemented by a processor, software, or combination thereof (e.g., firmware).

As illustrated in FIG. 16, the apparatus or system 1600 may comprise an electrical component 1602 for receiving digital cinematic master data that includes at least one of AR data or AR data for displaying one of an AR output object or a VR output object contemporaneously with video data formatted for display on a 2D screen. The component 1602 may be, or may include, a means for said contemporaneous displaying. Said means may include the processor 1610 coupled to the memory 1616, the transceiver 1612, and to the stereographic display 1614, the processor executing an algorithm based on program instructions stored in the memory. Such algorithm may include a sequence of more detailed operations, for example, receiving a timing signal from a player module or device that is playing video content for a 2D screen, detecting a timeline value based on the timing signal, and controlling play of immersive content so as to remain synchronized with the timeline.

The apparatus 1600 may further include an electrical component 1603 for determining a first value set indicating at least one of an angular field of view of the 2D screen or of an object appearing thereon. The component 1603 may be, or may include, a means for said determining. Said means may include the processor 1610 coupled to the memory 1616 and to a sensor (not shown), the processor executing an algorithm based on program instructions stored in the memory. Such algorithm may include a sequence of more detailed operations, for example, as described above in connection with use of registration marks on a screen or screen object. The sensor may comprise an image sensor, a wireless receiver, and infrared sensor, or other suitable sensor.

The apparatus 1600 may further include an electrical component 1604 for determining a second value set indicating a shortest current distance between the 2D screen and the apparatus. The component 1604 may be, or may include, a means for said determining. Said means may include the processor 1610 coupled to the memory 1616 and to a sensor (not shown), the processor executing an algorithm based on program instructions stored in the memory. Such algorithm may include a sequence of more detailed operations, for example, measuring a signal transmit time, analyzing onscreen registration marks using known screen geometry, or obtaining a current position relative to a screen using triangulation or association with a seat or zone assignment. The sensor may comprise an image sensor, a wireless receiver, and infrared sensor, or other suitable sensor, which may be shared with the component 1603, or dedicated for use by the component 1604.

The apparatus 1600 may further include an electrical component 1605 for calculating a third value set for causing an off-screen angular field of view of the at least one of the AR output object or the VR output object to have a fixed relationship to at least one of the angular field of view of the onscreen object or of the 2D screen. The component 1605 may be, or may include, a means for said calculating. Said means may include the processor 1610 coupled to the memory 1616, the processor executing an algorithm based on program instructions stored in the memory. Such algorithm may include a sequence of more detailed operations, for example, setting a size parameter based on a targeted angular field of view along one or more axes and at least one of an actual screen distance or a perceived distance to a stereographic screen object.

The apparatus 1600 may further include an electrical component 1606 for outputting data for displaying the at least one of the AR output object or the VR output object having the off-screen angular field of view. The component 1606 may be, or may include, a means for said outputting. Said means may include the processor 1610 coupled to the memory 1616, the transceiver 1612, and to the stereographic display device 1614, the processor executing an algorithm based on program instructions stored in the memory. Such algorithm may include a sequence of more detailed operations, for example, generating video data including stereographic view frames based on calculated virtual positions for off-screen objects at corresponding times of a timeline correlated to an onscreen program, and providing the video data to an input port of the stereographic display device 1614.

The apparatus 1600 may optionally include a processor module 1610 having at least one processor. The processor 1610 may be in operative communication with the modules 1602-1606 via a bus 1613 or similar communication coupling. The processor 1610 may effect initiation and scheduling of the processes or functions performed by electrical components 1602-1606.

In related aspects, the apparatus 1600 may include a network interface module (not shown) operable for communicating with system components over a computer network, instead of or in addition to the transceiver 1612. A network interface module may be, or may include, for example, an Ethernet port or serial port (e.g., a Universal Serial Bus (USB) port). In further related aspects, the apparatus 1600 may optionally include a module for storing information, such as, for example, a memory device 1616. The computer readable medium or the memory module 1616 may be operatively coupled to the other components of the apparatus 1600 via the bus 1613 or the like. The memory module 1616 may be adapted to store computer readable instructions and data for effecting the processes and behavior of the modules 1602-1606, and subcomponents thereof, or the processor 1610, or the method 1200 and one or more of the additional operations 1300-1500 disclosed herein. The memory module 1616 may retain instructions for executing functions associated with the modules 1602-1606. While shown as being external to the memory 1616, it is to be understood that the modules 1602-1606 can exist within the memory 1616.

The apparatus 1600 may include a transceiver 1612 configured as a wireless transmitter/receiver, or a wired transmitter/receiver, for transmitting and receiving a communication signal to/from another system component such as, for example, server shown in FIG. 422 or the screen output controller 522 shown in FIG. 5B. In alternative embodiments, the processor 1610 may include networked microprocessors from devices operating over a computer network. In addition, the apparatus 1600 may include a stereographic display or other immersive display device 1614 for displaying immersive content. The stereographic display device 1614 may be, or may include, any suitable stereographic AR or VR output device as described herein above, or as otherwise known in the art.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-Ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-Ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method by at least one of an AR output device or a VR output device, the method comprising:
    receiving, by at least one of an AR output device or a VR output device, digital data that includes at least one of augmented reality (AR) data or virtual reality (VR) data for displaying one of an AR output object or a VR output object contemporaneously with video data formatted for display on a 2D screen;
    determining at least one of an angular field of view of the 2D screen or an object appearing thereon;
    determining a shortest distance between the 2D screen and the at least one of the AR output device or the VR output device;
    calculating an off-screen angular field of view of the at least one of the AR output object or the VR output object having a fixed relationship to at least one of the angular field of view of the onscreen object or the 2D screen; and
    displaying the at least one of the AR output object or the VR output object having the off-screen angular field of view.

2. The method of claim 1, further comprising determining at least one of an orientation and position of the at least one of the AR output device or the VR output device, relative to the 2D screen.

3. The method of claim 2, wherein the calculating the off-screen angular field of view is further based on at least one of the orientation and position.

4. The method of claim 1, further comprising determining at least one of an orientation and position of the at least one of the AR output object or the VR output object, relative to the 2D screen.

5. The method of claim 4, wherein the calculating the off-screen angular field of view is further based on at least one of the orientation and position.

6. The method of claim 1, wherein the calculating the off-screen angular field of view is further based on defined perceptual criterion for at least a portion of the digital data.

7. The method of claim 6, wherein the perceptual criterion specifies a perceived size of the at least one of the AR output object or the VR output object relative to a related on-screen object of matching type according to a relation selected from: substantially greater than, substantially less than, or substantially equal to.

8. The method of claim 6, further comprising varying the perceptual criterion based on transitioning between different portions of the digital data.

9. The method of claim 1, wherein the digital data includes at least the VR data, and the VR output device renders the video data formatted for display on the 2D screen being a virtual 2D screen.

10. The method of claim 9, wherein the determining the at least one of an angular field of view of the 2D screen or an object appearing thereon comprises reading, from a computer memory, a preset value of the angular field of view of the 2D screen or of the object appearing thereon.

11. The method of claim 9, wherein the determining the shortest distance between the 2D screen and the at least one of the AR output device or the VR output device comprises reading, from a computer memory, a preset value for the shortest distance between the 2D screen and the VR output device.

12. The method of claim 11, further comprising configuring the virtual 2D screen and a surrounding virtual environment for output from the VR output device so that a perceived distance to the 2D screen substantially matches the preset value.

13. The method of claim 1, wherein the digital data includes at least the AR data, and a device distinct from the AR output device renders the video data formatted for display on the 2D screen.

14. The method of claim 13, wherein the determining the at least one of an angular field of view of the 2D screen or an object appearing thereon comprises measuring the angular field of view of the 2D screen or of the object appearing thereon at least in part using a sensor coupled to the AR output device.

15. The method of claim 13, wherein the determining the shortest distance between the 2D screen and the at least one of the AR output device or the VR output device comprises measuring shortest current distance between the 2D screen and the AR output device at least in part using a sensor coupled to the AR output device.

16. An apparatus for geometric matching of virtual reality (VR) or augmented reality (AR) output to on-screen content, comprising:
    a processor, a memory coupled to the processor, and a stereoscopic display device coupled to the processor, wherein the memory holds instructions that when executed by the processor, cause the apparatus to perform:
        receiving digital data that includes at least one of AR data or VR data for displaying one of an AR output object or a VR output object contemporaneously with video data formatted for display on a 2D screen;
        determining at least one of an angular field of view of the 2D screen or of an object appearing thereon;
        determining a shortest current distance between the 2D screen and the apparatus;
        calculating an off-screen angular field of view of the at least one of the AR output object or the VR output object having a fixed relationship to at least one of the angular field of view of the onscreen object or of the 2D screen; and
        displaying the at least one of the AR output object or the VR output object having the off-screen angular field of view.

17. The apparatus of claim 16, wherein the memory holds further instructions for determining at least one of an orientation and position of the apparatus relative to the 2D screen.

18. The apparatus of claim 17, wherein the memory holds further instructions for calculating the off-screen angular field of view further based on at least one of the orientation and position.

19. The apparatus of claim 16, wherein the memory holds further instructions for determining at least one of an orientation and position of the at least one of the AR output object or the VR output object, relative to the 2D screen.

20. The apparatus of claim 19, wherein the memory holds further instructions for calculating the off-screen angular field of view further based on at least one of the orientation and position.

* * * * *